(12) United States Patent
Majewski et al.

(10) Patent No.: US 10,106,228 B1
(45) Date of Patent: Oct. 23, 2018

(54) SONOBUOY ADAPTER KIT WITH PNEUMATIC AIR DIVERTER VALVE

(71) Applicant: Eagle Technology, LLC, Melbourne, FL (US)

(72) Inventors: Kenneth Majewski, Commack, NY (US); Thomas Lithen, Lynbrook, NY (US); Xiaochun Fisher, East Setauket, NY (US); Robert Eschbach, East Rockaway, NY (US); Robert Hammerquist, Huntington, NY (US); Alexander Price, East Setauket, NY (US)

(73) Assignee: Eagle Technology, LLC, Melbourne, FL (US)

( * ) Notice: Subject to any disclaimer, the term of this patent is extended or adjusted under 35 U.S.C. 154(b) by 0 days.

(21) Appl. No.: 16/000,101

(22) Filed: Jun. 5, 2018

Related U.S. Application Data

(63) Continuation-in-part of application No. 15/495,023, filed on Apr. 24, 2017.

(51) Int. Cl.
   *B63B 22/00* (2006.01)
   *B64D 1/02* (2006.01)
(52) U.S. Cl.
   CPC .............. *B63B 22/003* (2013.01); *B64D 1/02* (2013.01); *B63B 2022/006* (2013.01)
(58) Field of Classification Search
   CPC ... B63D 22/003; B63D 2022/006; B64D 1/08
   USPC ......................................................... 124/56
   See application file for complete search history.

(56) References Cited

U.S. PATENT DOCUMENTS

| | | | | |
|---|---|---|---|---|
| 3,240,200 A | * | 3/1966 | Jones ....................... | B64D 1/02 124/75 |
| 3,724,374 A | * | 4/1973 | Somerville .......... | G10K 11/006 102/417 |
| 3,905,291 A | * | 9/1975 | Corbin, Jr. ................ | F42B 3/04 102/430 |
| 3,921,120 A | * | 11/1975 | Widenhofer .......... | B63B 22/003 116/209 |
| 5,052,270 A | * | 10/1991 | Travor .................. | B63B 22/003 244/137.4 |
| 5,054,364 A | * | 10/1991 | Dragonuk ............. | B63B 22/003 244/137.1 |
| 5,063,823 A | * | 11/1991 | Marshall ............... | B63B 22/003 244/137.1 |
| 5,070,760 A | * | 12/1991 | Marshall .................. | B64D 1/04 244/137.4 |
| 5,076,134 A | * | 12/1991 | Marshall .................. | B64D 1/04 244/137.4 |
| H1025 H | * | 3/1992 | Dragonu ........................ | 89/1.51 |

(Continued)

*Primary Examiner* — Joshua E Freeman
(74) *Attorney, Agent, or Firm* — Edell, Shapiro & Finnan, LLC

(57) ABSTRACT

The present invention is directed toward an adapter for launching smaller sized sonobuoys from a standard size sonobuoy launching container. The adapters enable two smaller sized sonobuoys to be disposed within the standard size sonobuoy launching container in series. The adapter includes a diverter mechanism that is configured to launch a first smaller sized sonobuoy when the sonobuoy launching container receives a first burst of air, and launch a second smaller sized sonobuoy when the sonobuoy launching container receives a subsequent second burst of air.

20 Claims, 32 Drawing Sheets

(56) References Cited

U.S. PATENT DOCUMENTS

| | | | | |
|---|---|---|---|---|
| 5,155,288 A | * | 10/1992 | Marshall | B63B 22/003 89/1.51 |
| 5,379,267 A | * | 1/1995 | Sparks | B63B 22/18 367/18 |
| 5,623,113 A | * | 4/1997 | Valembois | F41H 9/08 102/340 |
| 5,973,994 A | * | 10/1999 | Woodall | F42B 15/22 367/3 |
| 7,278,416 B2 | | 10/2007 | Larcheveque et al. | |

* cited by examiner

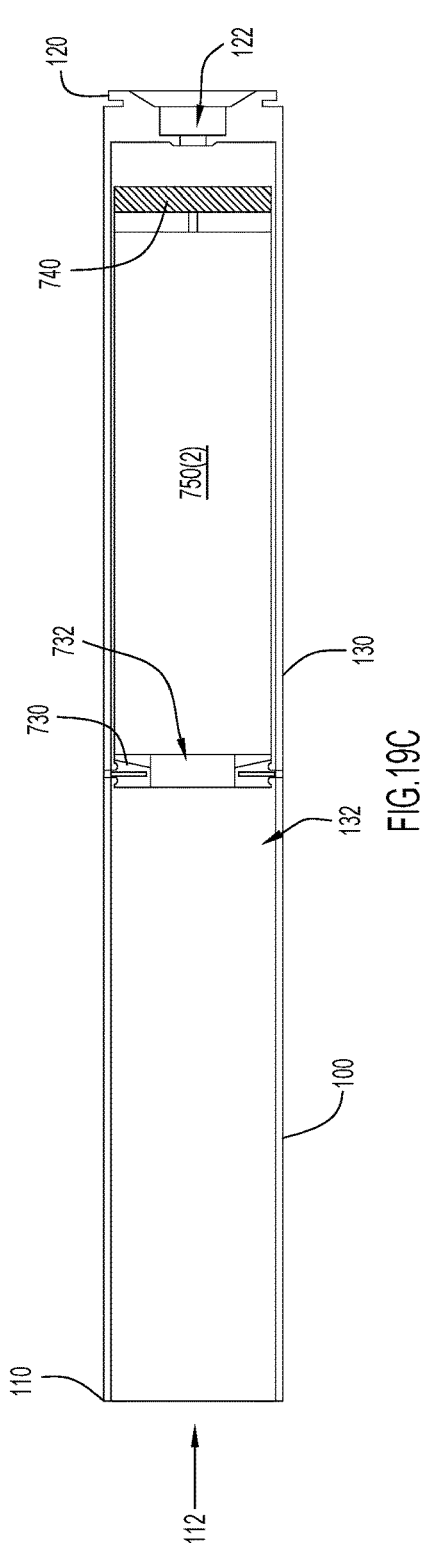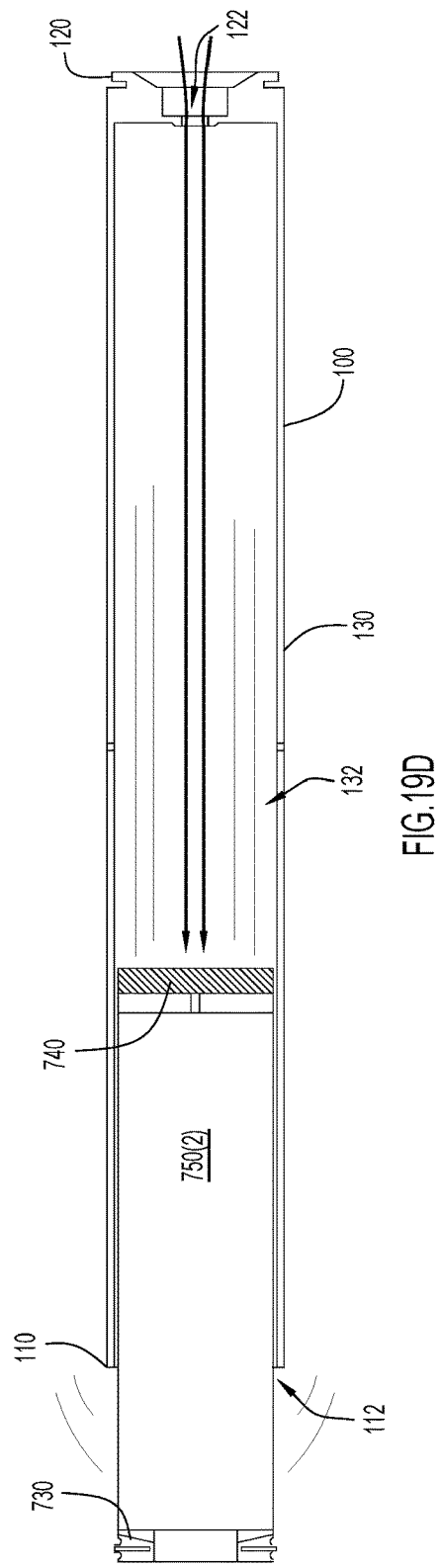

SONOBUOY ADAPTER KIT WITH PNEUMATIC AIR DIVERTER VALVE

CROSS-REFERENCE TO RELATED APPLICATIONS

This application is a continuation-in-part of U.S. Non-Provisional patent application Ser. No. 15/495,023, entitled "Miniature Sonobuoy Adapter Kit with Pneumatic Air Diverter Valve," filed Apr. 24, 2017, the disclosure of which is incorporated herein by reference in its entirety for all purposes.

BACKGROUND OF THE INVENTION

Sonobuoys are relatively small buoys (i.e., floating devices) equipped with expendable sonar systems that are dropped or ejected from aircraft or ships for the purpose of conducting anti-submarine warfare or underwater acoustic research. Typically, sonobuoys are stored, transported, and launched pneumatically from an aircraft with one sonobuoy per sonobuoy launching container (hereinafter "SLC"). Recent advances in the sonobuoy technology area have resulted in the creation of smaller sized sonobuoys (e.g., miniature sonobuoy, G-size sonobuoy, etc.). These smaller sized sonobuoys contain all of the same features as a conventional "A-size" sonobuoy, but are only about half the size of the conventional A-size sonobuoys. The smaller sized sonobuoys enable an aircraft to double the number of sonobuoys that can be carried, which doubles an aircraft's mission capabilities. However, aircraft that are currently in use in the industry are equipped only with A-size sonobuoy SLCs. Because of their reduced size, there is currently no method for pneumatically launching two smaller sized sonobuoys from a standard A-size sonobuoy SLC without drastically altering the A-size sonobuoy launcher or installing new sonobuoy launchers, both of which are expensive.

Accordingly, it would be desirable to provide an adapter kit that provides the capability of launching two smaller sized sonobuoys (i.e., either miniature or G-size sonobuoys) independently from a standard A-size SLC without altering the SLC. Additionally, it would be desirable to maximize the life cycle cost of the adapter kit by utilizing the pneumatic launching system of the SLC without requiring electrical systems, hydraulic systems, or other complicated mechanical systems. Furthermore, it would be desirable to automatically sequence the air from the pneumatic launching system of the SLC to independently launch each smaller sized sonobuoy from the SLC without requiring manual reconfiguration of the adapter kit. Finally, it would be desirable to have an adapter kit that is capable of being reloaded with smaller sized sonobuoys and reused for subsequent launchings of smaller sized sonobuoys.

SUMMARY OF THE INVENTION

The present disclosure is directed toward an adapter for launching G-size sonobuoys from a standard sized sonobuoy launching container. The adapter may include a first piston, a first endcap, a second endcap, and a diverter mechanism. The first piston may be disposed in a cavity of the sonobuoy launching container between a first end of the cavity and a second end of the cavity. The first endcap may be disposed in the cavity of the sonobuoy launching container proximate to the first end of the cavity. A first G-size sonobuoy may be retained in the cavity of the sonobuoy launching container between the first endcap and the first piston. The second endcap may be disposed in the cavity of the sonobuoy launching container proximate to the first piston. The diverter mechanism may be disposed within the cavity of sonobuoy launching proximate to the second end of the cavity. A second G-size sonobuoy may be retained in the cavity of the sonobuoy launching container between the second endcap and the diverter mechanism. The diverter mechanism may be in an open configuration that is configured to divert a first burst of air received by the sonobuoy launching container around the second G-size sonobuoy and to the first piston. After the first burst of air, the diverter mechanism may automatically reconfigure to a closed configuration. In the closed configuration, the diverter mechanism serves as a second piston when the sonobuoy launching container receives a subsequent second burst of air.

The present disclosure is further directed to a pneumatic diverter mechanism that may include a base, a plunger, and a rotary disc. The base may include a top side, a bottom side, and a central cavity disposed within the top side of the base. The base may further include at least one annular opening disposed on the top side of the base, where the at least one annular opening extends through to the bottom side of the base. The plunger may be slidably and rotatably disposed within the central cavity of the base. The plunger may be configured to be repositioned between a first position, a second position, and a third position. The plunger may include a cylindrical portion that has a first end and a second end. The plunger may also include one or more extension arms that extend from the cylindrical portion between the first end and the second end. The rotary disc may be operatively coupled to the plunger. The rotary disc may include at least one air port. The rotary disc may be rotatable between an open position and a closed position. In the open position, the at least one air port may be aligned with the at least one annular opening of the base. In the closed position, the at least one air port may be misaligned with the at least annular opening of the base. When the plunger is in the first position, the rotary disc is in the open position, and the pneumatic diverter mechanism receives a first burst of air, the first burst of air may flow through the at least one air port of the rotary disc and the at least one annular opening of the base. The first burst of air may also cause the plunger to slide from the first position to the second position. When in the second position, the plunger may automatically rotate from the second position to the third position. The rotation of the plunger from the second position to the third position may cause the rotary disc to rotate from the open position to the closed position.

In addition, the present disclosure is also directed to a pneumatic diverter mechanism that may include a base, a plunger and a rotary disc. The base may include a top side, a bottom side, and a central cavity disposed within the top side of the base. The base may further include one or more annular openings disposed in the top side of the base, the one or more annular openings extending through the base to the bottom side of the base. The plunger may be rotatably disposed within the central cavity of the base such that the plunger is rotatable between a first position and a second position. The rotary disc may be coupled to the plunger. The rotary disc may include one or more air ports. The rotary disc may rotate between an open position and a closed position. In the open position, the one or more air ports are aligned with the one or more annular openings. In the closed position, the one or more air ports are misaligned with the one or more annular openings. When the pneumatic diverter mechanism receives a first burst of air, the first burst of air flows through the pneumatic diverter mechanism via the aligned one or more air ports of the rotary disc and the one or more annular openings of the base. After the first burst of air and to the pneumatic diverter mechanism receiving a second burst of air, the plunger automatically rotates from the first position to the second position, which causes the rotary disc to rotate from the open position to the closed position.

BRIEF DESCRIPTION OF THE DRAWINGS

FIGS. 19A-19D illustrate cross-sectional views of the launching stages for launching two G-size sonobuoys from the G-size sonobuoy adapter kit disposed within a standard sonobuoy launching container, as illustrated in FIG. 18.

Like reference numerals have been used to identify like elements throughout this disclosure.

DETAILED DESCRIPTION OF THE INVENTION

Figure 1:
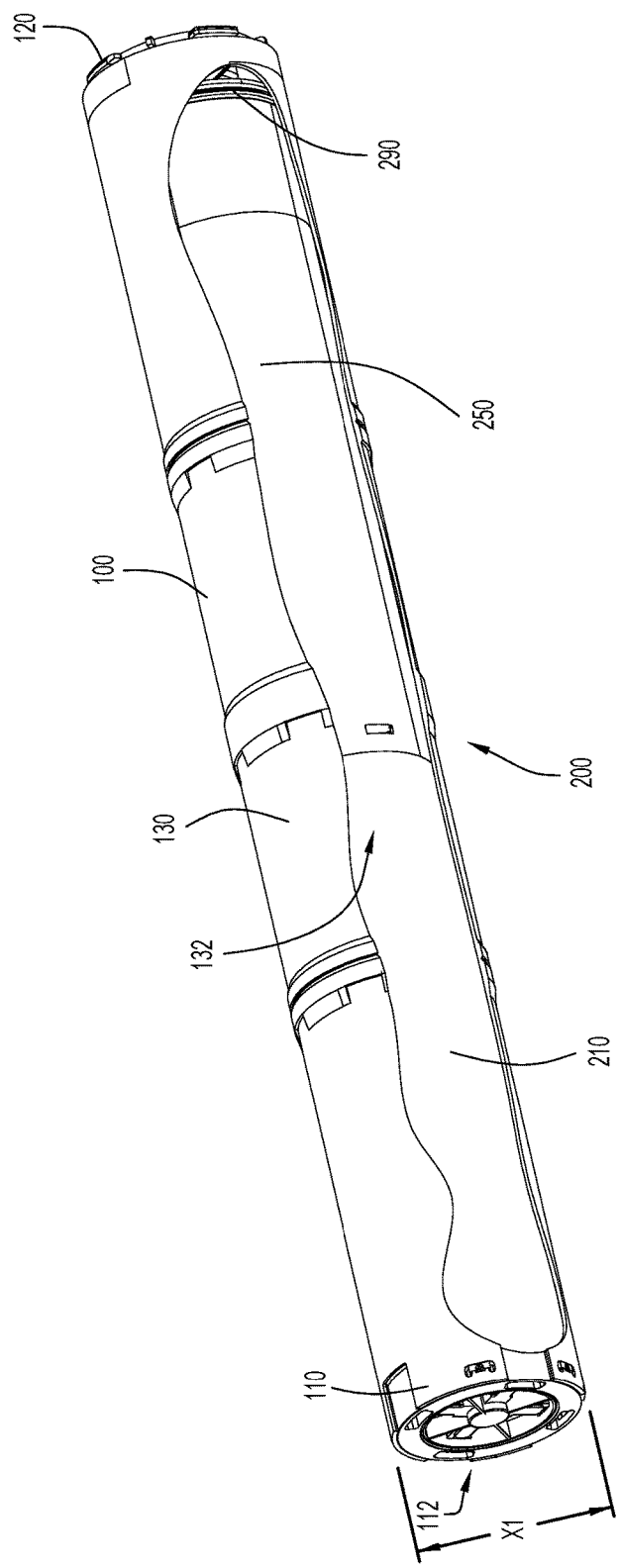
FIG. 1 illustrates a perspective view of a standard sonobuoy launching container equipped with a miniature sonobuoy adapter kit according to the present disclosure.
Figure 10:
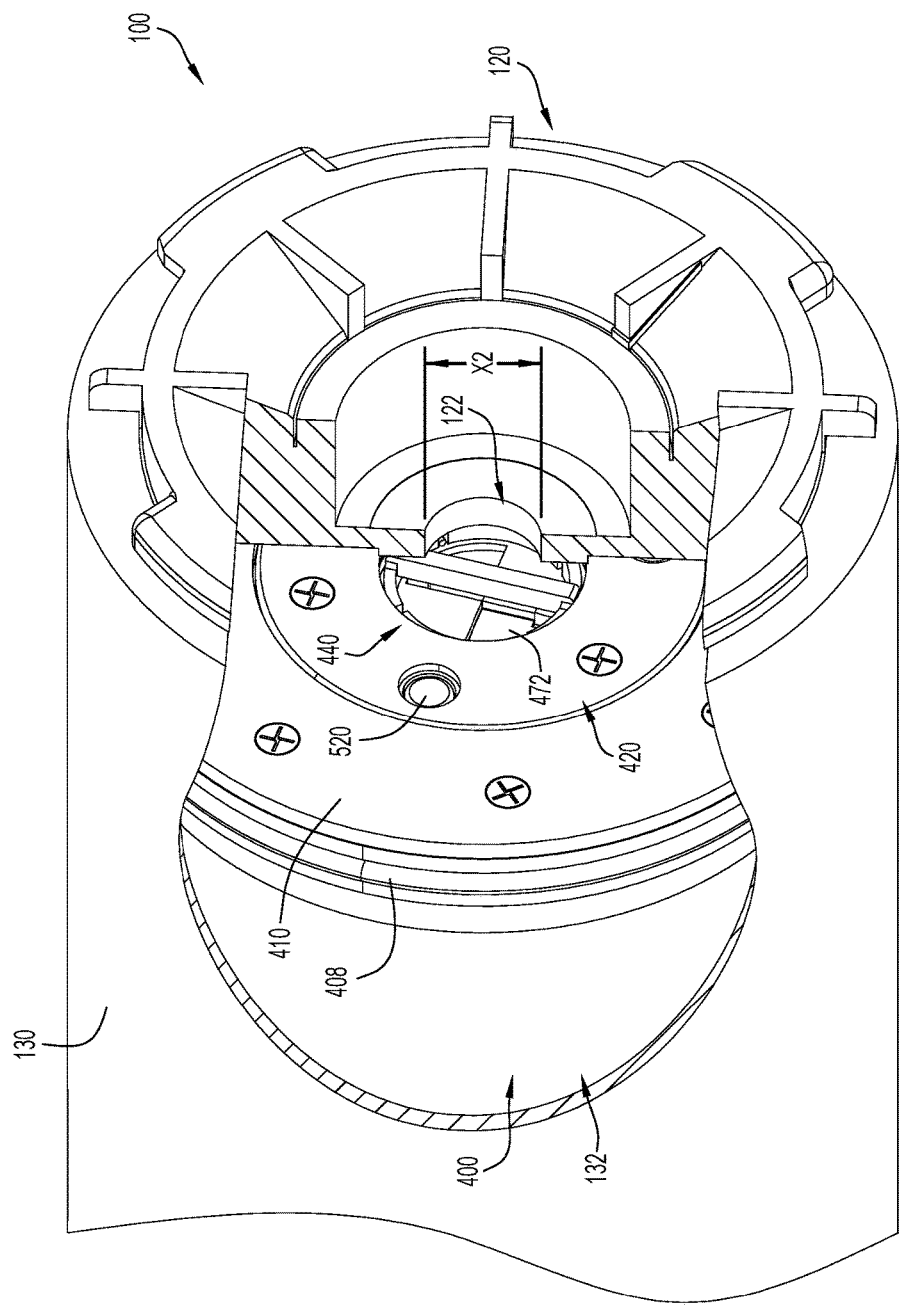
FIG. 10 illustrates a perspective view of the first embodiment of the pneumatic air diverter valve illustrated in FIG. 4 disposed within the standard sonobuoy launching container illustrated in FIG. 1.
Figure 16:
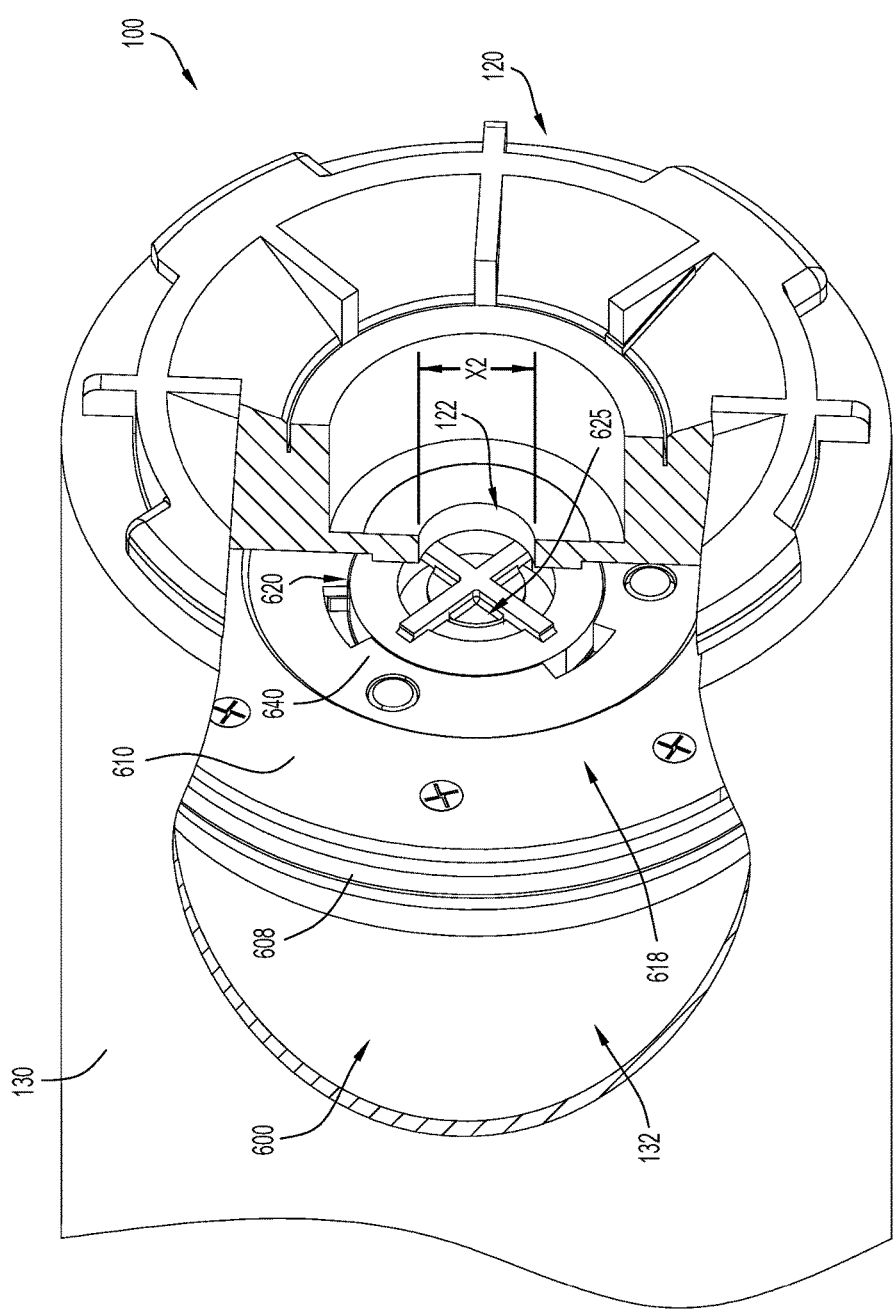
FIG. 16 illustrates a perspective view of the second embodiment of the pneumatic air diverter valve illustrated in FIG. 12 disposed within the standard sonobuoy launching container illustrated in FIG. 1.

Illustrated in FIG. 1 is a conventional A-size sonobuoy launching container 100 (hereinafter "SLC") with a miniature sonobuoy adapter kit 200 disposed within the SLC 100. As illustrated, the SLC 100 is substantially cylindrical with a first end 110, an opposite second end 120, and a sidewall 130 spanning between the first and second ends 110, 120. The first end 110 of the SLC 100 includes a substantially circular opening 112 with a diameter of X1, while, as best illustrated in FIGS. 10 and 16, the second end 120 of the SLC 100 includes a substantially circular aperture 122 with a diameter of X2. The diameter X1 of the opening 112 is larger than the diameter X2 of the aperture 122. Moreover, the first end 110, the second end 120, and the sidewall 130 collectively define a cavity 132. FIG. 1 illustrates the sidewall 130 of the SLC 100 with a cutaway section for illustrative purposes only.

Figure 2:
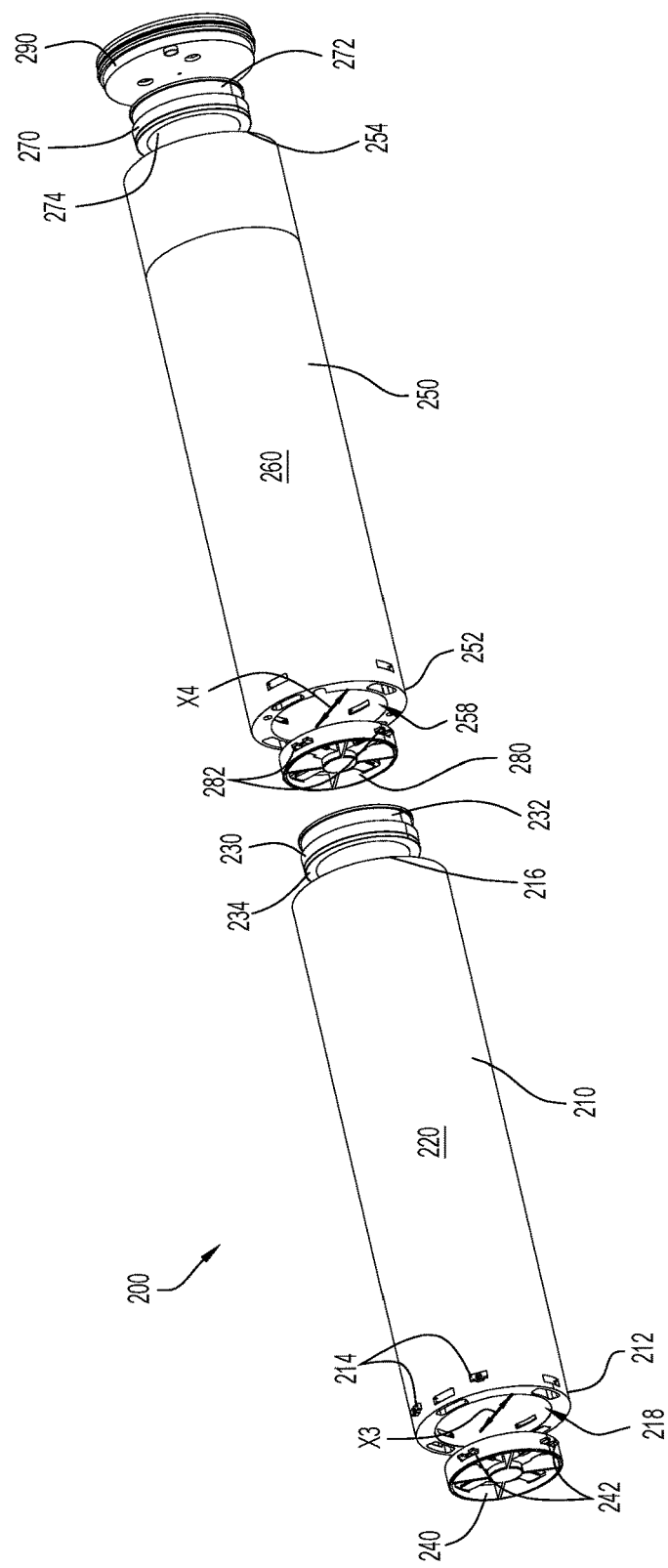
FIG. 2 illustrates an exploded view of the miniature sonobuoy adapter kit according to the present disclosure.

As illustrated in FIG. 1, the adapter kit 200 is disposed within the cavity 132 of the SLC 100. As illustrated in FIGS. 1 and 2, the adapter kit 200 comprises a first, or lower, adapter member 210, a second, or upper, adapter member 250, and a diverter valve or mechanism 290. The first adapter member 210, second adapter member 250, and the diverter mechanism 290 are disposed in-line with one another within the cavity 132 of the SLC 100. As further illustrated, the first adapter member 210 is disposed proximate to the first end 110 and the opening 112 of the SLC 100, while the diverter mechanism 290 is disposed proximate to the second end 120 and the aperture 122 of the SLC 100. The second adapter member 250 is disposed between the first adapter member 210 and the diverter mechanism 290.

Figure 3A:
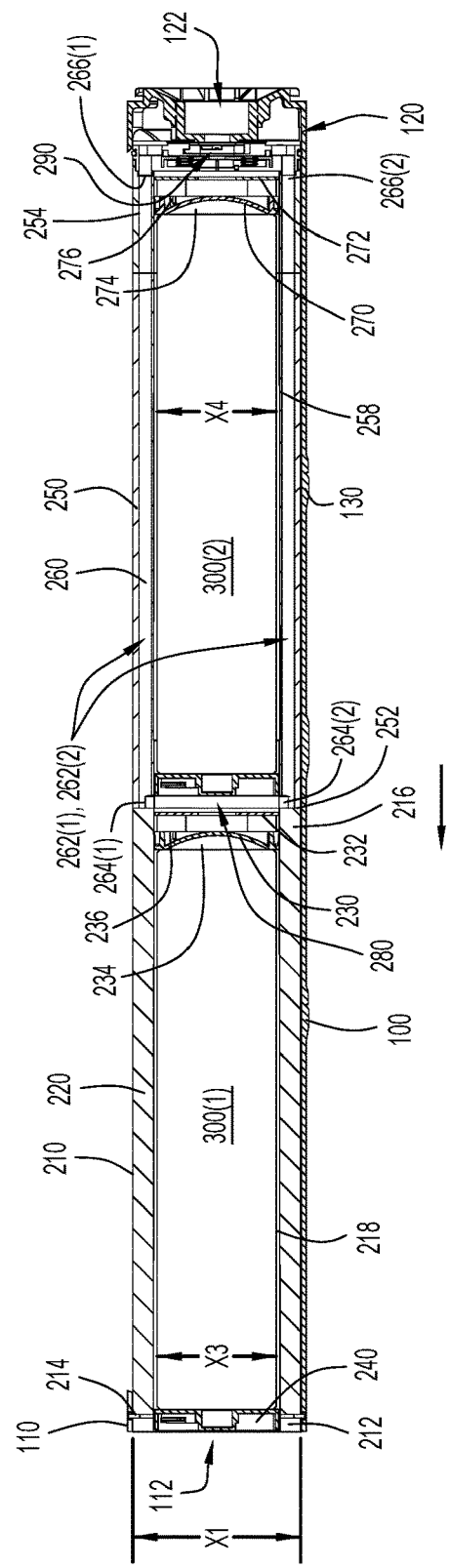
FIGS. 3A-3D illustrate cross-sectional views of the launching stages for launching two miniature sonobuoys from the miniature sonobuoy adapter kit disposed within a standard sonobuoy launching container, as illustrated in FIG. 1.

Aircraft may be equipped with multiple SLC's 100 configured to deploy or launch sonobuoys from the SLC's 100. As shown in FIG. 3A, the adapter kit 200 disclosed enables the standard sized SLC's 100 to be loaded with two miniature sonobuoys 300(1), 300(2) without requiring the SLC's to be altered or reconfigured. As described herein, the adapter kit 200 enables an SLC 100 to independently launch each one of the two miniature sonobuoys 300(1), 300(2) from the SLC 100 via a pneumatic launching mechanism.

Continuing with the exploded view of the adapter kit 200 illustrated in FIG. 2, the first adapter member 210 is a substantially cylindrical tube with a first end 212, an opposite second end 216, and a sidewall 220 connecting the first and second ends 212, 216 of the first adapter member 210. The first adapter member 210 further includes a central passage 218 that extends through the first adapter member 210 from the first end 212 to the second end 216. The central passage 218 has an interior diameter of X3, which is smaller than the diameter X1 of the opening 112 of the SLC 100, but may be larger than the diameter X2 of the aperture 122 of the SLC 100. The first adapter member 210 is sized and shaped to fit within the cavity 132 of the SLC 100 proximate to the first end 110 of the SLC, while being configured to accept a first miniature sonobuoy 300(1) within the central passage 218.

The first adapter member 210 further includes a piston 230 and an endcap 240. As illustrated in FIG. 3A, both the piston 230 and the endcap 240 are sized and shaped to fit within the central passage 218. The piston 230 and the endcap 240 may both be substantially disc-shaped with diameters substantially equal to the diameter X3 of the central passage 218. As illustrated, the endcap 240 is disposed within the central passage 218 proximate to the first end 212 of the first adapter member 210, while the piston 230 is disposed within the central passage 218 proximate to the second end 216 of the first adapter member 210. In addition, a first miniature sonobuoy 300(1) is disposed within the central passage 218 between the endcap 240 and the piston 230. As best illustrated in FIG. 2, the endcap 240 may include a series of retainer clips 242 disposed around the perimeter or periphery of the endcap 240, where the retainer clips 242 interact with the central passage 218 to temporarily retain the endcap 240 within the first end 212 of the first adapter member 210. In addition, the piston 230 may include a first, or upper, disc member 232, a second, or lower, disc member 234, and a series of support members 236 coupling the first disc member 232 to the second disc member 234. Thus, the support members 236 space the first disc member 232 from the second disc member 234.

Similar to the first adapter member 210, the second adapter member 250 is also a substantially cylindrical tube with a first end 252, an opposite second end 254, and a sidewall 260 connecting the first and second ends 252, 254 of the second adapter member 250. Furthermore, the second adapter member 210 includes a central passage 258 that extends through the second adapter member 250 from the first end 252 to the second end 254. The central passage 258 has an interior diameter of X4, which is substantially equal to that of the interior diameter X3 of the central passage 218 of the first adapter member 210. Thus, the diameter X4 of the central passage 258 is smaller than the diameter X1 of the opening 112 of the SLC 100, but may be larger than the diameter X2 of the aperture 122 of the SLC 100. Also similar to the first adapter member 210, the second adapter member 250 is sized and shaped to fit within the cavity 132 of the SLC 100. As illustrated in FIG. 3A, when disposed within the cavity 132 of the SLC 100, the first end 252 of the second adapter member 250 is in abutment with the second end 216 of the first adapter member 210. Furthermore, the diverter mechanism 290, which is disposed within the cavity 132 of the SLC 100 proximate to the second end 120 of the SLC 100, is in abutment with the second end 254 of the second adapter member 250.

Like the first adapter member 210, the second adapter member 250 also includes a piston 270 and an endcap 280. As illustrated in FIG. 3A, both the piston 270 and the endcap 280 are sized and shaped to fit within the central passage 258 of the second adapter member 250. The piston 270 and the endcap 280 may both be substantially disc-shaped with diameters substantially equal to the diameter X4 of the central passage 258 of the second adapter member 250. The piston 270 and the endcap 280 of the second adapter kit 250 are identical to the piston 230 and the endcap 240 of the first adapter kit 210. When the second adapter kit 250 is disposed within the cavity 132 of the SLC 100, the endcap 280 is disposed within the central passage 258 proximate to the first end 252 of the second adapter member 250, while the piston 270 is disposed within the central passage 258 proximate to the second end 254 of the second adapter member 250. As illustrated in FIG. 3A, a second miniature sonobuoy 300(2) is disposed within the central passage 258 of the second adapter member 250 between the endcap 280 and the piston 270. Like endcap 240, and as best illustrated in FIG. 2, the endcap 280 may include a series of retainer clips 282 disposed around the perimeter or periphery of the endcap 280, where the retainer clips 282 interact with the central passage 258 of the second adapter member 250 to temporarily retain the endcap 280 within the first end 252 of the second adapter member 250. In addition, the piston 270 may include a first, or upper, disc member 272, a second, or lower, disc member 274, and a series of support members 276 coupling the first disc member 272 to the second disc member 274, like that of piston 230.

The second adapter member 250, however, differs from the first adapter member 210 in that the second adapter member 250 includes two channels 262(1), 262(2) disposed within the sidewall 260 of the second adapter member 250. First channel 262(1) includes a distal end 264(1) disposed proximate to the first end 252 of the second adapter member 250, and a proximal end 266(1) disposed proximate to the second end 254 of the second adapter member 250. Thus, first channel 262(1) spans nearly the entire length of the second adapter member 250 through the sidewall 260 of the second adapter member 250. Similarly, second channel 262(2) includes a distal end 264(2) disposed proximate to the first end 252 of the second adapter member 250, and a proximal end 266(2) disposed proximate to the second end 254 of the second adapter member 250. Thus, second channel 262(2) spans nearly the entire length of the second adapter member 250 through the sidewall 260 of the second adapter member 250. As best illustrated in FIG. 3A, the first and second channels 262(1), 262(2) are disposed within the sidewall 260 such that the first and second channels 262(1), 262(2) are oriented opposite of one another (i.e., they are spaced circumferentially around the sidewall 260 approximately 180 degrees from one another). The proximal ends 266(1), 266(2) of the channels 262(1), 262(2) serve as the inlets of the channels 262(1), 262(2), where the proximal ends 266(1), 266(2) are in fluid communication with the diverter mechanism 290. Thus, as explained in further detail below, the proximal ends 266(1), 266(2) of the channels 262(1), 262(2) receive air that travels through the diverter mechanism 290 such that air travels along the channels 262(1), 262(2). Moreover, the distal ends 264(1), 264(2) of the channels 262(1), 262(2) serve as outlets of the channels 262(1), 262(2), where the distal ends 264(1), 264(2) are in fluid communication with the space disposed between the endcap 280 of the second adapter member 250 and the piston 230 of the first adapter member 210. Thus, air that is diverted into the proximal ends 266(1), 266(2) of the channels 262(1), 262(2) by the diverter mechanism 290 travels along the channels 262(1), 262(2) to the distal ends 264(1), 264(2) of the channels 262(1), 262(2) and into the space between the endcap 280 of the second adapter member 250 and the piston 230 of the first adapter member 210.

As previously explained, the diverter mechanism 290 is disposed within the cavity 132 of the SLC 100 proximate to the second end 120 and the aperture 122 of the SLC 100. As will be further detailed below, the diverter mechanism 290 is capable of receiving a series of air bursts via a pneumatic launching mechanism (not shown) through the aperture 122 of the second end 120 of the SLC 100. The diverter mechanism 290 is configured to divert a first burst of air from the pneumatic launching mechanism along the channels 262(1), 262(2), while diverting a second burst of air from the pneumatic launching mechanism along the central passage 258 of the second adapter member 250.

Continuing with FIGS. 2 and 3A, disposed on the exterior of the sidewall 220 of the first adapter member are a series of fasteners 214 that interact with the sidewall 130 of the SLC 100 proximate to the first end 110 and the opening 112 of the SLC to retain the first adapter member 210 within the cavity 132 of the SLC 100. In one embodiment, the fasteners 214 may be retainer clips that retain the first adapter member 210 within the cavity 132 of the SLC 100, while, in another embodiment, the fasteners 214 may be screws or bolts that retain the first adapter member 210 within the cavity 132 of the SLC 100. Because the first adapter member 210 is disposed more proximate to the opening 112 of the first end 110 of the SLC 100 than the second adapter member 250 and the diverter mechanism 290, and because the first adapter member 210, second adapter member 250, and diverter mechanism 290 are greater in size than the diameter X2 of the aperture 122 of the second end 120 of the SLC 100, the fasteners 214 retain not just the first adapter member 210 within the cavity 132 of the SLC 100, but also the second adapter member 250 and the diverter mechanism 290.

FIGS. 3A-3D illustrate the launching stages of the miniature sonobuoys from the SLC 100 via the adapter kit 200. As previously explained, and as illustrated in FIG. 3A, prior to launching one of the miniature sonobuoys 300(1), 300(2) from the SLC 100, the first miniature sonobuoy 300(1) is disposed within the central passage 218 of the first adapter 210 of the adapter kit 200, while the second miniature sonobuoy 300(2) is disposed within the central passage 258 of the second adapter 250 of the adapter kit 200. The fasteners 214 of the first adapter member 210 retain the adapter members 210, 250 and the diverter mechanism 290 within the cavity 132 of the SLC 100, while the endcap 240 retains the first miniature sonobuoy 300(1) within the first adapter member 210, and the endcap 280 retains the second miniature sonobuoy 300(2) within the second adapter member 250. When launched, the sonobuoys 300(1), 300(2) are expelled out from the first end 110 of the SLC 100 via the opening 112.

Figure 3B:
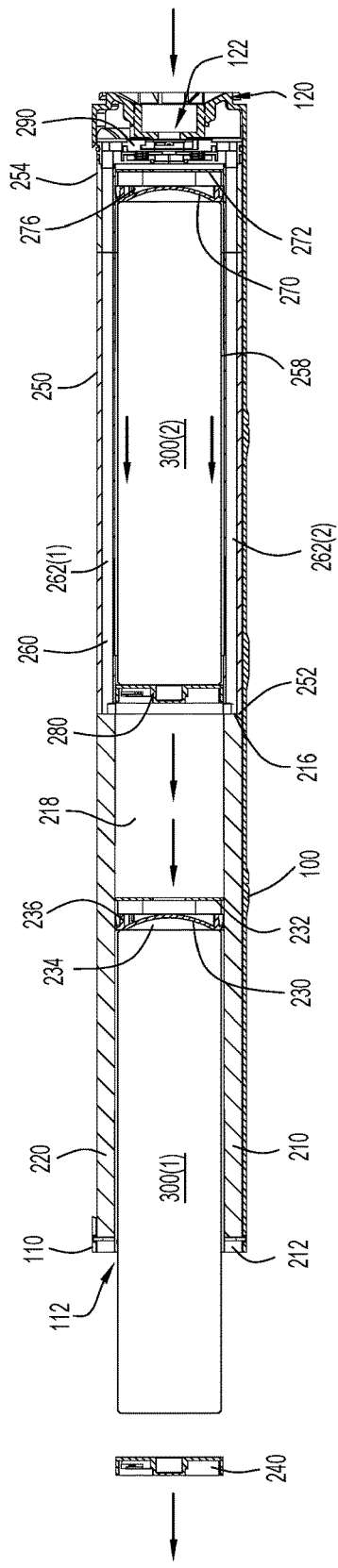

As illustrated in FIG. 3B, when the SLC 100 receives the first burst of air from the pneumatic launching mechanism, the air travels into the diverter mechanism 290 via the aperture 122 on the second end 120 of the SLC 100. The diverter mechanism 290 is initially set to divert the received first burst of air along the channels 262(1), 262(2) and into the space between the endcap 280 of the second adapter member 250 and the piston 230 of the first adapter member 210. The first burst of air is configured to act on the first disc member 232 of the piston 230, causing the first disc member 232 to slightly deform (i.e., become concave). Because the first disc member 232 is spaced from the second disc member 234 via the support members 236, the first disc member 232 is free to deform when the pressure or force of the air burst is applied to the first disc member 232. The deformation of the first disc member 232 of the piston 230 at least partially forms a seal with the interior surface of the sidewall 220 that forms the central passage 218. The force or pressure from the first burst of air causes the second disc member 234 of the piston 230 to apply a force onto the miniature sonobuoy 300(1), which, in turn imparts a force onto the endcap 240. The pressure in the space between the endcap 280 of the second adapter member 250 and the piston 230 of the first adapter member 210 increases until the force imparted onto the endcap 240 is enough to deform (e.g. bend, shear, etc.) the retainer clips 242. This results in the endcap 240, the first miniature sonobuoy 300(1), and the piston 230 being launched or expelled from the central passage 218 of the first adapter member 210, and ultimately from the cavity 132 of the SLC 100 via the opening 112 of the first end 110 of the SLC 100.

Figure 3C:
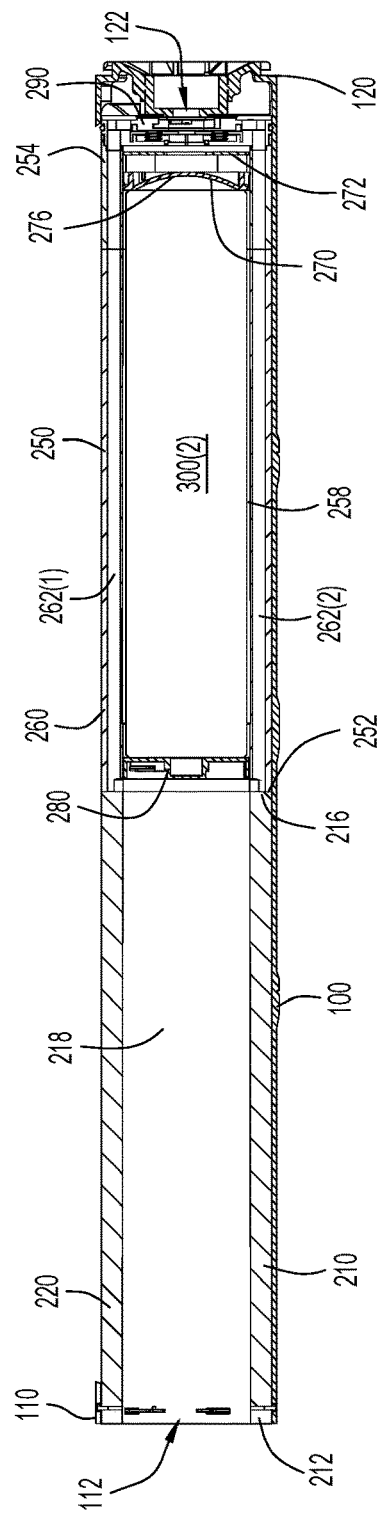

FIG. 3C illustrates the SLC 100 and the adapter kit 200 after the first miniature sonobuoy 300(1) has been launched. As illustrated, the first adapter member 210 no longer contains the endcap 240, the first miniature sonobuoy 300(1), and the piston 230 within the central passage 218. However, because the diverter mechanism 290 diverted the first burst of air through the channels 262(1), 262(2), the second miniature sonobuoy 300(2) is still disposed within the central passage 258 of the second adapter member 250. As previously explained, the endcap 280 retains the second miniature sonobuoy 300(2) and the piston 270 within the central passage 258 of the second adapter member 250. As further detailed below, after receiving the first burst of air, the diverter mechanism 290 resets to divert subsequent bursts of air through the central passage 258 of the second adapter member 250 in order to launch the second miniature sonobuoy 300(2).

Figure 3D:
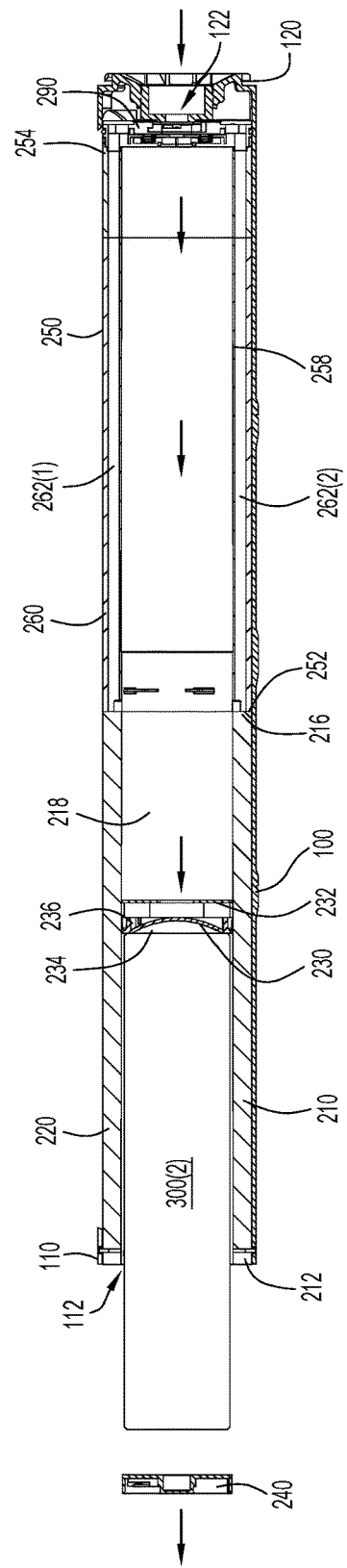

As illustrated in FIG. 3D, when the SLC 100 receives the second burst of air from the pneumatic launching mechanism, the air travels into the diverter mechanism 290 via the aperture 122 on the second end 120 of the SLC 100, where the diverter mechanism 290 diverts the second burst of air into the central passage 258 of the second adapter member 250. The second burst of air is configured to act on the first disc member 272 of the piston 270, causing the first disc member 272 to slightly deform (i.e., become concave). Because the first disc member 272 is spaced from the second disc member 274 via the support members 276, the first disc member 272 is free to deform when the pressure or force of the air burst is applied to the first disc member 272. The deformation of the first disc member 272 of the piston 270 at least partially forms a seal with the interior surface of the sidewall 260 that forms the central passage 258 of the second adapter member 250. The force or pressure from the second burst of air causes the second disc member 274 of the piston 270 to impart a force onto the second miniature sonobuoy 300(2), which in turn imparts a force onto the endcap 280. The pressure applied to the piston 270 of the second adapter member 250 increases until the force imparted onto the endcap 280 is enough to deform (e.g. bend, shear, etc.) the retainer clips 282. This results in the endcap 280, the second miniature sonobuoy 300(2), and the piston 270 being launched or expelled from the central passage 258 of the second adapter member 250, through the central passage 218 of the first adapter member 210, and, ultimately, from the cavity 132 of the SLC 100 via the opening 112 of the first end 110 of the SLC 100.

Figure 4:
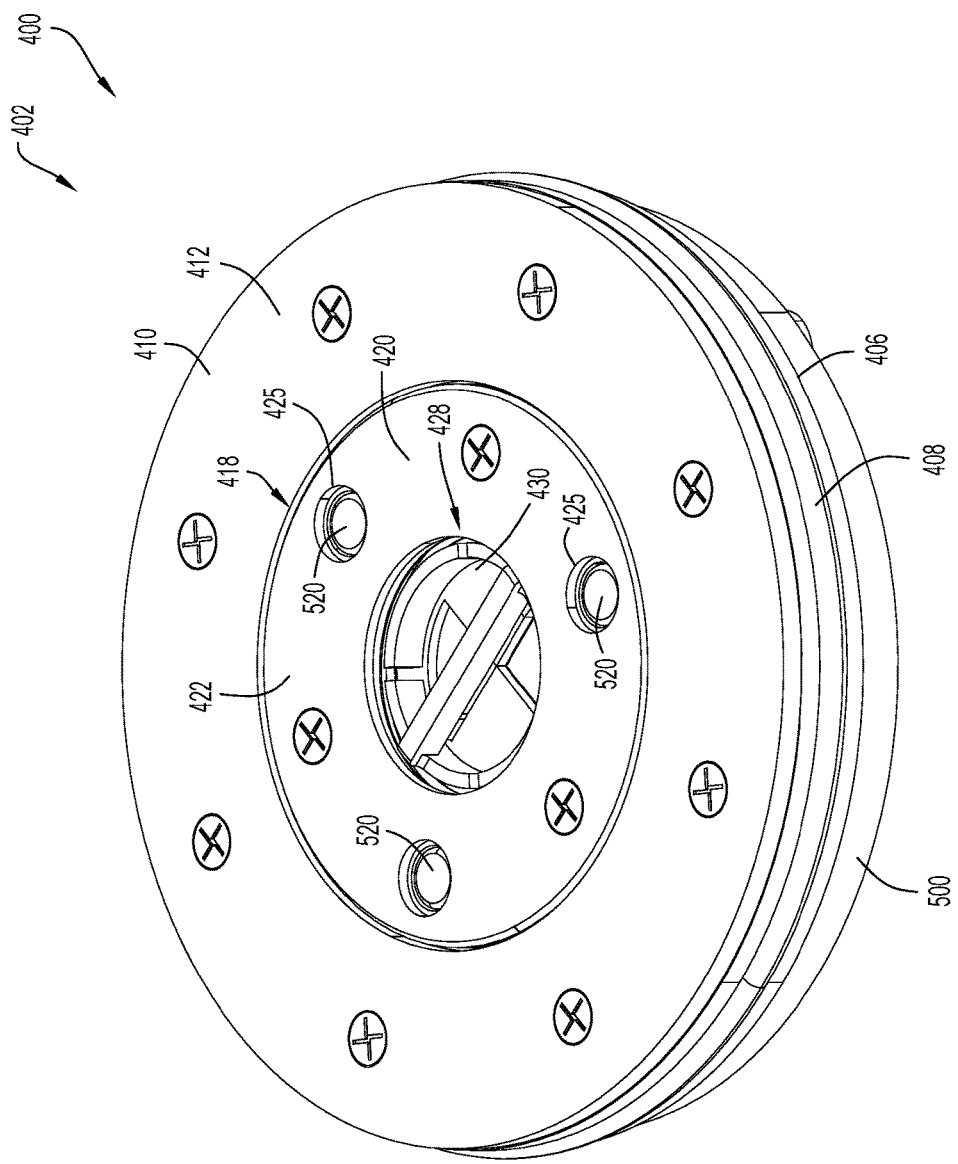
FIG. 4 illustrates a perspective view of the first embodiment of the pneumatic air diverter valve of the embodiment of the miniature sonobuoy adapter kit illustrated in FIG. 2.
Figure 5:
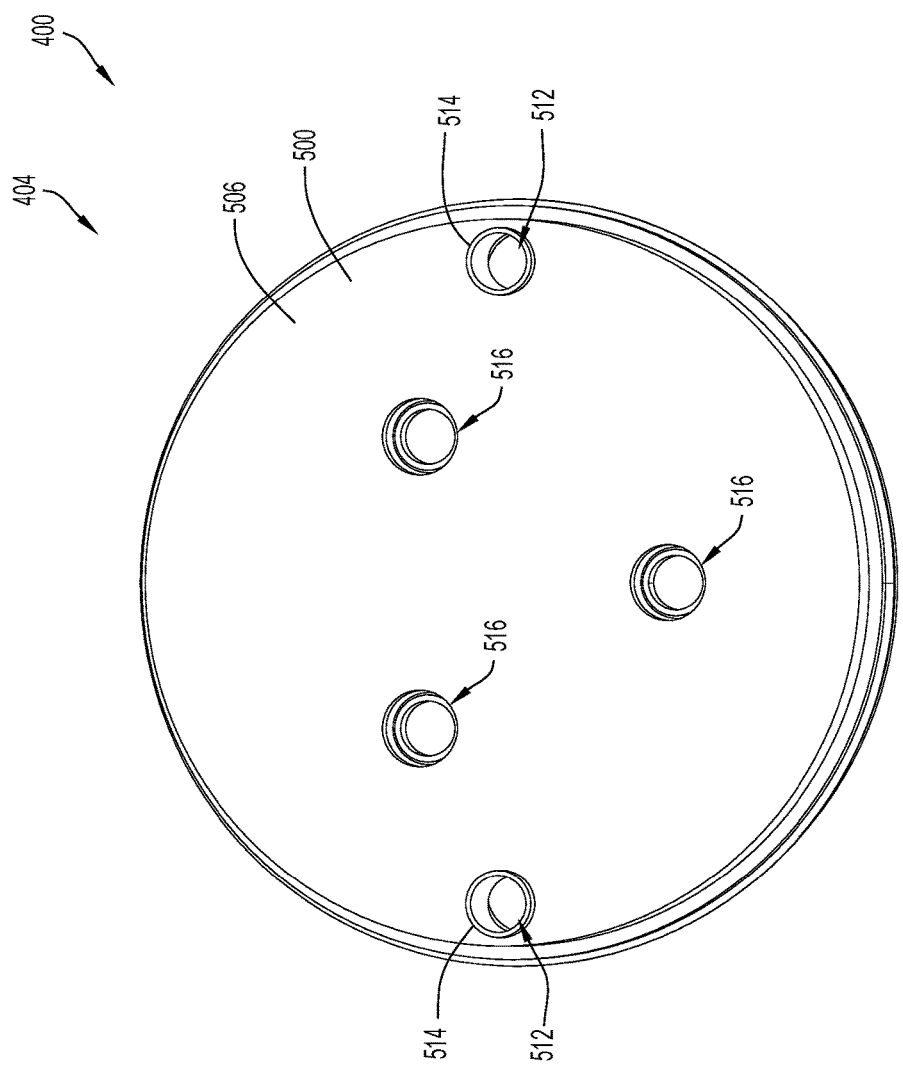
FIG. 5 illustrates a bottom view of the first embodiment of the pneumatic air diverter valve illustrated in FIG. 4.

Turning to FIGS. 4-8, 9A-9B, 10, and 11A-11F, illustrated is a first embodiment of the diverter mechanism 290, where the diverter mechanism 290 is a rotary disc mechanism 400. As illustrated in FIGS. 4 and 5, the rotary disc mechanism 400 is substantially disc-shaped with a top side 402, an opposite bottom side 404, and a sidewall 406 spanning between the top side 402 and the bottom side 404. As best illustrated in the exploded view of FIG. 6, the rotary disc mechanism 400 is collectively formed from a plurality of components, including, a base 500, a piston 460, a rotary disc 440, a rotary spring 430, a rotary cover 420, and a top cover 410.

Figure 7:
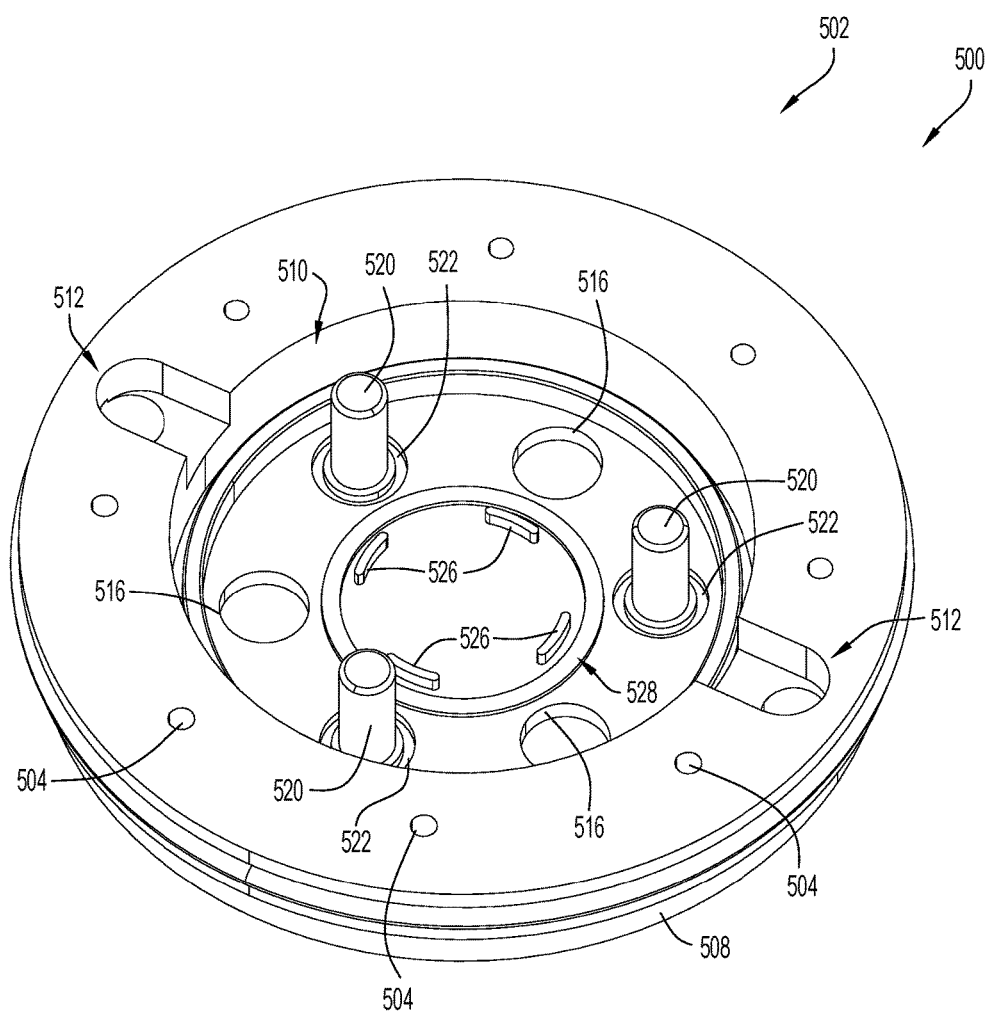
FIG. 7 illustrates a perspective view of a base portion of the first embodiment of the pneumatic air diverter valve illustrated in FIG. 4.

The base 500, as illustrated in FIGS. 5 and 7, includes a top side 502, a bottom side 506, and a sidewall 508 spanning between the top side 502 and the bottom side 506. As illustrated in FIG. 5, the bottom side 506 of the base 500 serves as the bottom side 404 of the rotary disc mechanism 400. Furthermore, the sidewall 508 of the base 500 serves primarily as the sidewall 406 of the rotary disc mechanism 400. Returning to FIG. 7, centrally disposed within the top side 502 of the base 500 is a central cavity 510. Furthermore, also disposed within the top side 502 of the base 500 is a plurality of apertures 504, where the apertures 504 are oriented annularly around the central cavity 510. As further explained below, the annular apertures 504 are configured to at least partially receive the fastener 417 of the top cover 410.

FIG. 7 further illustrates that a pair of outer openings 512 are disposed in the top side 502 of the base 500 such that the outer openings are in fluid communication with the central cavity 510. As illustrated in FIGS. 5 and 7, the outer openings 512 are through holes that extend through the base 500 from the top side 502 to the bottom side 506. FIG. 5 illustrates that each of the outer openings 512 includes a boss or flange 514 that extends from the bottom side 506 of the base 500 proximate to, and disposed around, the outer openings 512. When the bottom surface 506 of the base 500 of the rotary disc mechanism 400 is in abutment with the second end 254 of the second adapter member 250, the bosses 514 of the outer openings 512 are configured to be at least partially disposed within the proximal ends 266(1), 266(2) of the channels 262(1), 262(2) such that the outer openings 512 of the base 500 are in fluid communication with the channels 262(1), 262(2) of the second adapter member 250. Thus, the bosses 514 are configured to align the base 500, and as a result, the rotary disc mechanism 400, with the second adapter member 250 such that the outer openings 512 are in fluid communication with the channels 262(1), 262(2) of the second adapter member 250. In addition, the bosses 514 are also configured to form a seal between the channels 262(1), 262(2) of the second adapter member 250 and the outer openings 512 such that, as the rotary disc mechanism 400 diverts received air through the outer openings 512 and into the channels 262(1), 262(2) of the second adapter member 250, air does not escape between the rotary disc mechanism 400 and the second adapter member 250.

As best illustrated in FIG. 7, disposed within the central cavity 510 of the base 500 are a series of inner openings 516. In the embodiment illustrated in FIGS. 5 and 7, the central cavity 510 of the base 500 includes three inner openings 516 (through holes) that extend through the central cavity 510 to the bottom side 506 of the base 500. When the bottom surface 506 of the base 500 of the rotary disc mechanism 400 is in abutment with the second end 254 of the second adapter member 250, the inner openings 516 are aligned with the central passage 258 of the second adapter member 250 such that the inner openings 516 are in fluid communication with the central passage 258. The inner openings 516 are equally spaced around the periphery of the central cavity 510, where the inner openings 516 are offset from one another by approximately 120 degrees around the periphery of the central cavity 510.

Figure 6:
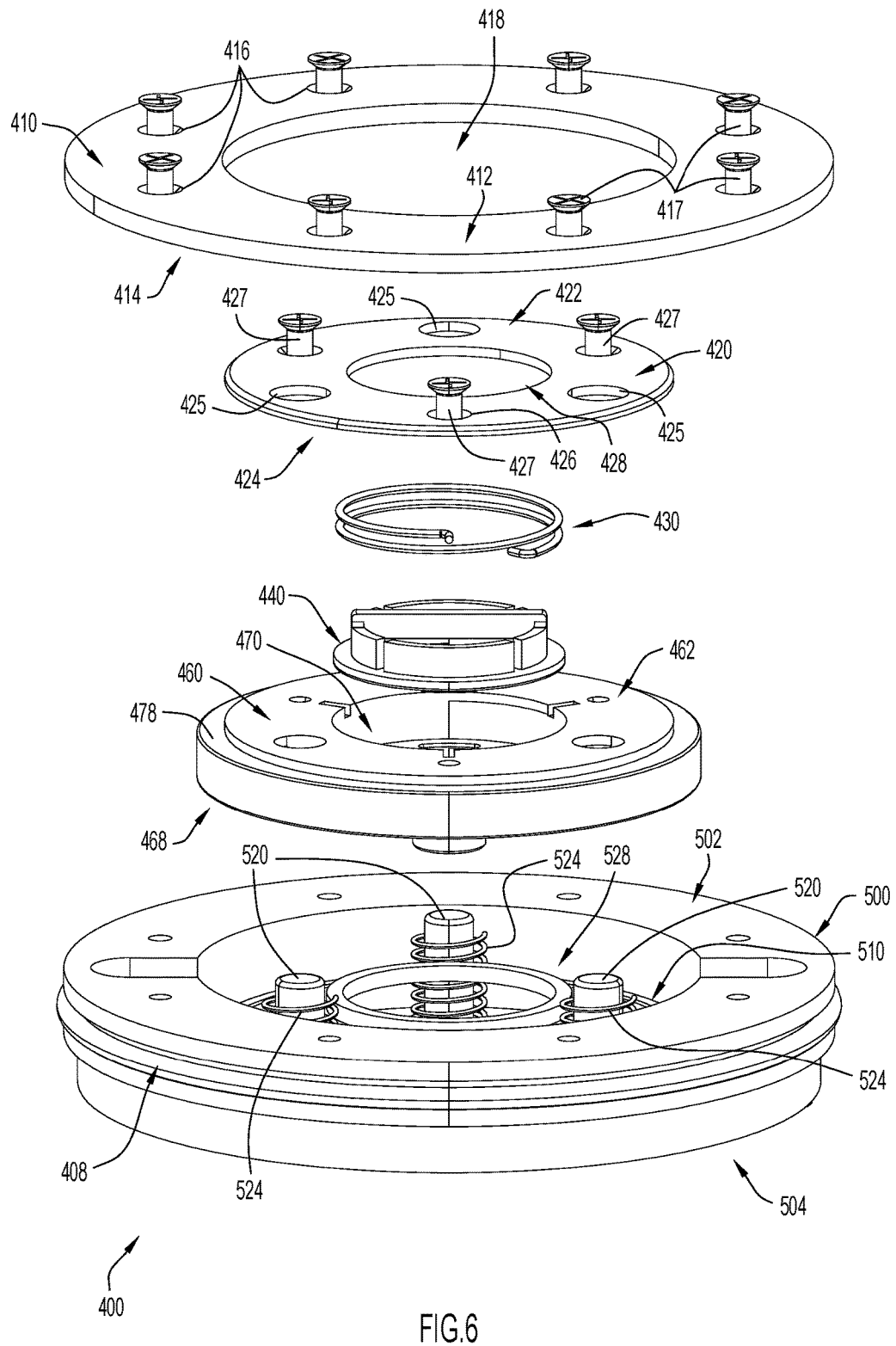
FIG. 6 illustrates an exploded view of the first embodiment of the pneumatic air diverter valve illustrated in FIG. 4.

Also disposed within the central cavity 510 of the base 500 is a series of piston guide pins 520. In the embodiment illustrated in FIGS. 5 and 7, the central cavity 510 of the base 500 includes three guide pins 520 that extend upwardly through the central cavity 510 toward the top side 502 of the base 500. Like the inner openings 516, the guide pins 520 are equally spaced around the periphery of the central cavity 510 where the guide pins 520 are offset from one another by approximately 120 degrees around the periphery of the central cavity 510. As further illustrated, each guide pin 520 is disposed half way between two inner openings 516 along the periphery of the central cavity 510 such that the guide pins 520 and the inner openings 516 are oriented in an alternating fashion around the periphery of the central cavity 510. Disposed around the base (i.e., the coupling of the guide pins 520 to the central cavity 510) of each guide pin 520 is a groove or depression 522. Furthermore, as best illustrated in FIG. 6, a resilient member or spring 524 is disposed around each of the guide pins 520. Each resilient member 524 is positioned around its respective guide pin 520 and at least partially disposed within the groove 522. Thus, grooves 522 retain each resilient member 524 in position around the guide pins 520.

Continuing with FIG. 7, the central cavity 510 of the base 500 also includes a plurality of tabs 526 disposed centrally within the central cavity 510. In the embodiment illustrated in FIG. 7, the central cavity 510 includes four arcuate tabs 526 that are equally spaced from one another while being disposed inward from the guide pins 520 and the inner openings 516. The tabs 526 are oriented with respect to one another such that the tabs 526 partially form the outline of a circle, where the tabs 526 are offset by approximately 90 degrees from one another. The tabs 526 extend upwardly through the central cavity 510 toward the top side 502 of the base 500. FIG. 7 further illustrates a seal or gasket ring 528 concentrically disposed within the central cavity 510, and also around the tabs 526. Moreover, the gasket ring 528 is disposed radially inward from the guide pins 520 and the inner openings 516 (i.e., the gasket ring 528 is more centrally disposed than the guide pins 520 and the inner openings 516).

Figure 8:
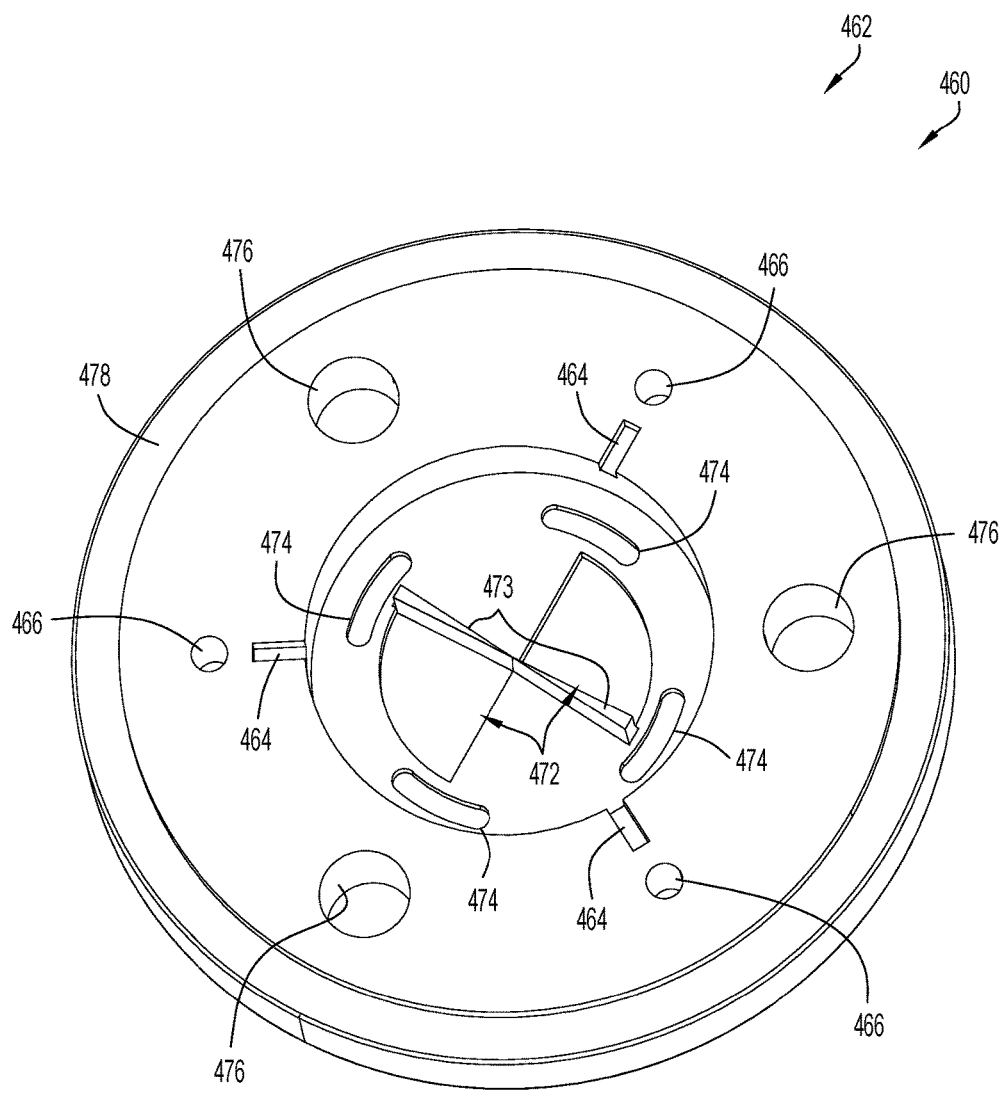
FIG. 8 illustrates a perspective view of a piston of the first embodiment of the pneumatic air diverter valve illustrated in FIG. 4.

Turning to FIGS. 6 and 8, illustrated is the piston 460 of the rotary disc mechanism 400. As best illustrated in FIG. 6, the piston 460 is configured to be slidably disposed within the central cavity 510 of the base 500. Thus, the piston 460 is approximately the same diameter as that of the central cavity 510. However, as will be further detailed below, the height or thickness of the piston 460 is less than that of the height or depth of the central cavity 510 of the base 500. The piston 460 is substantially disc-shaped with a top side 462 and a bottom side 468. Like the base 500, disposed centrally within the top side 462 of the piston 460 is a cavity 470. Moreover, disposed in the top side 462 of the piston 460 is a plurality of apertures 466 (e.g., blind holes), where the apertures 466 are oriented annularly around the cavity 470. As further explained below, the annular apertures 466 are configured to at least partially receive the fasteners 427 of the rotary cover 420. Also disposed in the top side 462 of the piston 460 is a plurality of openings 476, where, like the annular apertures 466, the openings 476 are oriented annularly around the cavity 470. The annular openings 476 are through holes that extend entirely through the piston 460 from the top side 462 to the bottom side 468. The annular openings 476 are larger in diameter than the annular apertures 466, and are configured to slidably receive the piston guide pins 520 of the base 500. Thus, the piston 460 slides along the piston guide pins 520 of the base 500 (i.e., the guide pins 520 slide through the annular openings 476) when the piston 640 moves up and down through the central cavity 510 of the base 500.

FIGS. 6 and 8 further illustrate an annular indentation or depression 478 within the top side 462 of the piston 460. The depression 478 is disposed along the outer edge of the top side 462 of the piston 460 such that the depression 478 extends along the outer periphery of the top side 462 of the piston 460.

The top side 462 of the piston 460 also includes a series of radial slits 464 that at least partially extend outwardly from the cavity 470 through the top side 462 of the piston 460. In the embodiment illustrated, the piston 460 includes three slits 464 that are aligned with the three annular apertures 466. However, other embodiments of the piston 460 may include any number of slits 464, and the slits 464 may not be aligned with the annular apertures 466.

As best illustrated in FIG. 8, the cavity 470 of the piston 460 is substantially circular and includes two air ports 472 centrally disposed within the cavity 470 and plurality of equally spaced annular slots 474 disposed around the air ports 472. Like the tabs 526 of the central cavity 510 of the base 500, the slots 474 are oriented with respect to one another such that the slots 474 partially form the outline of a circle (i.e., around the periphery of the base of the cavity 470), where the slots 474 are offset by approximately 90 degrees from one another. The slots 474 extend through the cavity 670 to the bottom side 468 of the piston 460. Moreover, the slots 474 are substantially equal in length to the tabs 526 of the central cavity 510 of the base 500. Furthermore, the air ports 472 disposed within the cavity 470 are substantially triangular or pie shaped (e.g., the two air ports may constitute two opposing quadrants of a circle as shown in the example in FIG. 8) and, like the slots 474, extend through the cavity 470 to the bottom side 468 of the piston 460. As illustrated, a linear walled member 473 extends through the air ports 472 such that the walled member 473 is disposed on only one side of each of the air ports 472. In other embodiments, the piston 460 may contain any number of air ports 472.

Figure 9:
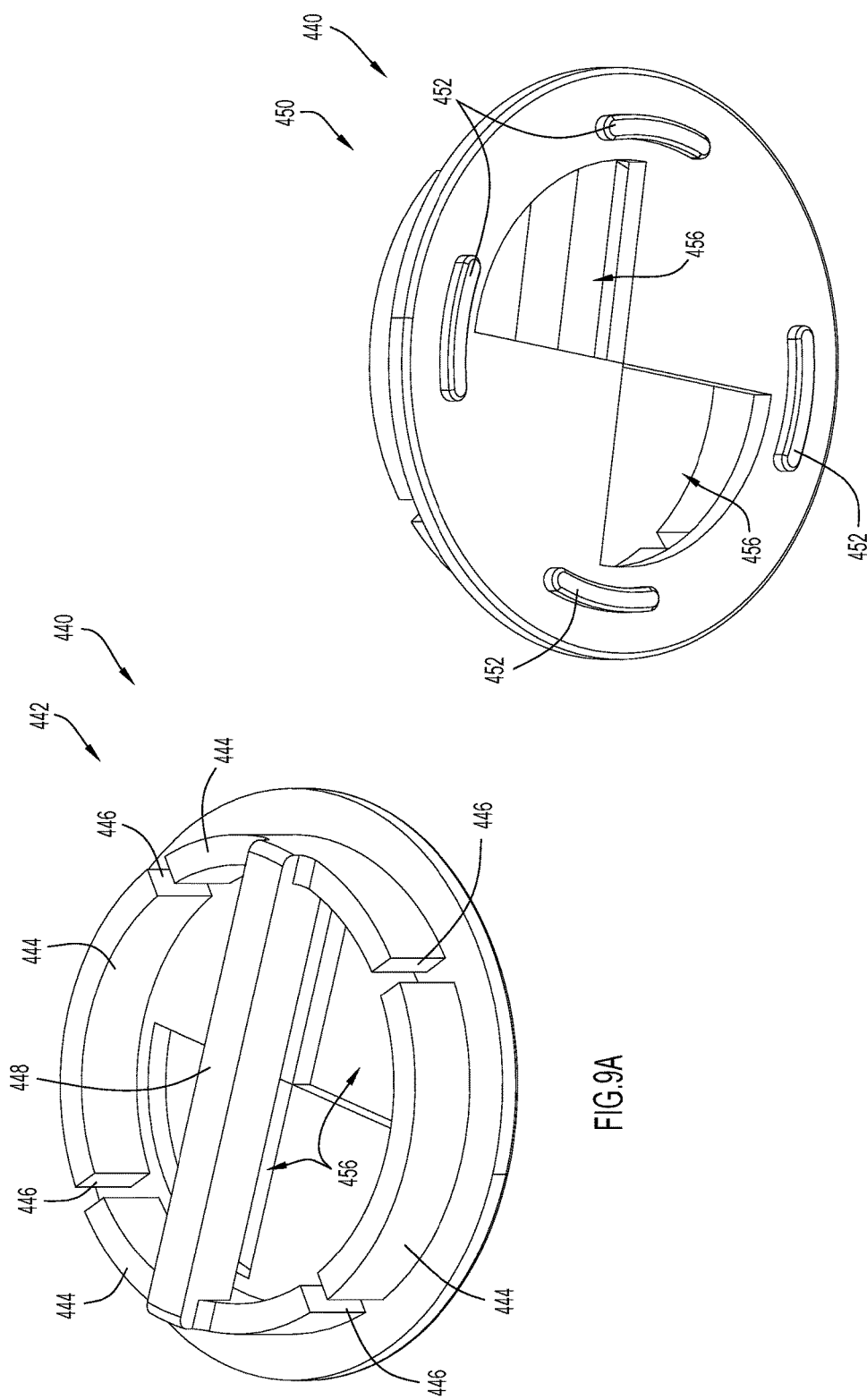
FIG. 9A illustrates a perspective view of a top of a rotary disc of the first embodiment of the pneumatic air diverter valve illustrated in FIG. 4.
FIG. 9B illustrates a perspective view of a bottom of the rotary disc illustrated in FIG. 9A.

Turning to FIGS. 6, 9A, and 9B, illustrated is the rotary disc 440 of the rotary disc mechanism 400. As best illustrated in FIG. 6, the rotary disc 440 is configured to rotatably disposed within the cavity 470 of the piston 460 such that the rotary disc 440 rotates about a substantially vertical axis that is concentric to both the rotary disc 440 and the piston 460. Thus, the rotary disc 440 is approximately the same diameter as that of the cavity 470 of the piston 460. The rotary disc 440 is substantially disc-shaped with a top side 442 and a bottom side 450. As best illustrated in FIG. 9A, extending upwardly from the top side 442 of the rotary disc 440 is a series of annular flanges 444. The flanges 444 are oriented annularly about the top side 442 of the rotary disc 440 such that the flanges 444 collectively form a circular shape. FIG. 9A further illustrates that a slit 446 is disposed between each one of the flanges 444. Thus, in the embodiment illustrated in FIGS. 6, 9A, and 9B, the rotary disc 440 include four upstanding flanges 444 and four slits 446. Other embodiments of the rotary disc 440 may include any number of flanges 444 and slits 446. Furthermore, FIG. 9A also illustrates a lever or cross-member 448 extends between two flanges 444 that oppose one another such that the cross-member 448 extends across a portion of the top side 442 of the rotary disc 440.

As best illustrated in FIG. 9B, the bottom side 450 of the rotary disc 440 includes a series of four locking tabs 452 that are equally spaced around the periphery of the bottom side 450 of the rotary disc 440. The locking tabs 452 extend downward from the bottom side 450 of the rotary disc 440. Similar to the tabs 526 of the central cavity 510 of the base 500 and the slots 474 of the cavity 470 of the piston 460, the tabs 452 are oriented with respect to one another such that the tabs 452 partially form the outline of a circle (i.e., around the periphery of the bottom side 450 of the rotary disc 440), where the tabs 452 are offset by approximately 90 degrees from one another. In addition, the tabs 452 are substantially equal in length to the tabs 526 of the central cavity 510 of the base 500 and the slots 474 of the cavity 470 of the piston 460.

The rotary disc 440 also includes a pair of air ports 456 that extend through the rotary disc 440 from the top side 442 to the bottom side 450. Like the air ports 472 of the cavity 470 of the piston 460, the air ports 456 of the rotary disc 440 are substantially triangular or pie shaped and approximately equal in size to the air ports 472 of the cavity 470 of the piston 460. Furthermore, the number of air ports 456 of the rotary disc 440 are equal to the number of air ports 472 of the cavity 470 of the piston 460.

Returning to FIG. 6, a rotational or torsional spring 430 is disposed around the rotary disc 440 and disposed within the cavity 470 of the piston 460. While not illustrated, the torsional spring 430 may include flanges or extension members that are configured to interact with both the slits 446 of the rotary disc 440 and the slits 464 of the piston 460. The torsional spring 430 is configured to bias the rotary disc 440 to a position where the air ports 456 of the rotary disc 440 are aligned with the air ports 472 of the cavity 470 of the piston 460.

FIG. 6 further illustrates a rotary cover 420 that is configured to be disposed on, and coupled to, the piston 460. The rotary cover 420 is also disc-shaped with a top side 422 and a bottom side 424. The rotary cover 420 includes a central opening 428 that extends through the rotary cover 420 from the top side 422 to the bottom side 424. The central opening 428 is substantially equal in diameter to that of the cavity 470 of the piston 460. Moreover, like the piston 460, the rotary cover 420 includes a plurality of apertures 426 and a plurality of openings 425 that are disposed annularly around the central opening 428. The annular openings 425 are substantially equal in diameter to that of the annular openings 476 of the piston 460. Furthermore, the annular apertures 426 may be substantially equal in diameter to that of the annular apertures 466 of the piston 460. Additionally, the annular apertures 426 of the rotary disc 420 are configured to be aligned with the annular apertures 466 of the piston, while the annular openings 425 of the rotary disc 420 are configured to be aligned with the annular openings 476 of the piston 460. Thus, a fastener 427 (e.g., a screw, pin, bolt, etc.) may be inserted through the annular apertures 426 of the rotary disc 420 and at least partially through the annular apertures 466 of the piston 460 to secure the bottom side 424 of the rotary disc 420 to the top side 462 of the piston 460. When secured to the top side 462 of the piston 460, the rotary disc 420 covers the slits 464 in which portions of the torsional spring 430 are inserted to secure the torsion spring 430 within the cavity 470 of the piston 460. Furthermore, the rotary disc 420 has a diameter substantially equal to that of the portion of the top side 462 of the piston that is disposed inward from the depression 478 such that, when the rotary disc 420 is secured to the top side 462 of the piston 460, the rotary disc 420 does not cover the depression 478 of the piston 460.

In addition, FIG. 6 illustrates a top cover 410 that is configured to be disposed on, and coupled to, the base 500. The top cover 410 is disc-shaped with a top side 412 and a bottom side 414. As illustrated, the top cover 410 includes a central opening 418 that extends through the top cover 410 from the top side 412 to the bottom side 414. The central opening 418 of the top cover 410 contains a diameter that is slightly smaller than the diameter of the central cavity 510 of the base 500 and the diameter of the piston 460. More specifically, the diameter of the top cover 410 is equal to the diameter of the rotary cover 420 and the portion of the top side 462 of the piston 460 that is disposed inward from the depression 478. When the bottom side 414 of the top cover 410 is disposed on the top side 502 of the base 500, the bottom side 414 of the top cover 410 at least partially covers the depression 478 of the piston 460.

The top cover 410 also includes a series of apertures 416 that are oriented annularly around the central opening 418 of the top cover 410. The annular apertures 416 of the top cover 410 are configured to align with the annular apertures 504 disposed on the top side 502 of the base 500. Thus, when the bottom side 414 of the top cover 410 is disposed on the top side 502 of the base 500, fasteners 417 (e.g., screws, pins, bolts, etc.) may be inserted through the annular apertures 416 of the top cover 410 and at least partially into the annular apertures 504 of the base 500 to secure the top cover 410 to the base 500. When the top cover 410 is secured to the base 500, the piston 460, rotary disc 440, torsional spring 430, and rotary cover 420 are secured to the base 500 with the capability of sliding throughout the central cavity 510 of the base 500.

Returning to FIG. 4, the top side 402 of the rotary disc mechanism 400 is collectively formed from the top side 412 of the top cover 410, the top side 422 of the rotary cover 420, the ends of the guide pins 520, and the rotary disc 440. As illustrated, the rotary disc 440 is visible through the central opening 428 of the rotary cover 420, while the ends of the guide pins 520 are visible through the annular openings 425 of the rotary cover 420. In addition, the rotary cover 420, guide pins 520, and rotary disc 440 are visible through the central opening 418 of the top cover 410.

Turning to FIG. 10, illustrated is the rotary disc mechanism 400 disposed within the cavity 132 of the SLC 100 proximate to the second end 120 of the SLC 100, where the SLC 100 is illustrated with a cutaway portion that is for illustrative purposes only. When disposed within the cavity 132, the O-ring 408 of the rotary disc mechanism 400 forms a seal along the inner surface of the sidewall 130 that forms the cavity 132. Moreover, the rotary disc 440 is disposed proximate to, and in fluid communication with, the aperture 122 of the second end 120 of the SLC 100 such that air is capable of traveling through the apertures 122 of the second end 120 of the SLC 100 and into the rotary disc mechanism 400 via the rotary disc 440 and the piston 460.

Figure 11A:
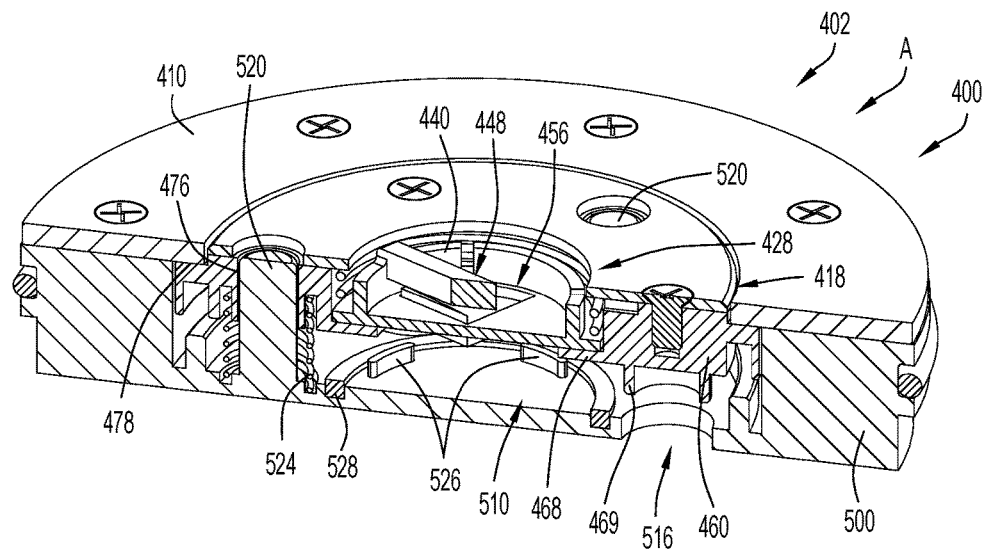
FIGS. 11A-11F illustrate cross-sectional view of the operational stages of the first embodiment of the pneumatic air diverter valve illustrated in FIG. 5.

FIGS. 11A-11F illustrate the cross-sectional views of the operation and various positions of the components of the rotary disc mechanism 400 during the various stages of launching two miniature sonobuoys 300(1), 300(2), as illustrated in FIGS. 3A-3D. As illustrated in FIG. 11A, the rotary disc mechanism 400 is oriented in static stage A, which occurs prior to the rotary disc mechanism 400 receiving a first burst of air from the pneumatic launching mechanism. The resilient members 524 disposed around the guide pins 520 bias the piston 460 towards an upward position within the central cavity 510 of the base 500, where the depression 478 of the piston 460 is in abutment with the top cover 410. Moreover, in this first static position A, the rotary disc 440 is rotated into the locked position, where the air ports 456 are not aligned with the air ports 472 of the cavity 470 of the piston 460. In addition, while not illustrated, when in the locked position, the tabs 452 on the bottom side 450 of the rotary disc 440 are disposed within slots 474 of the cavity 470 of the piston 460 to retain the rotary disc 440 in the locked position.

Figure 11B:
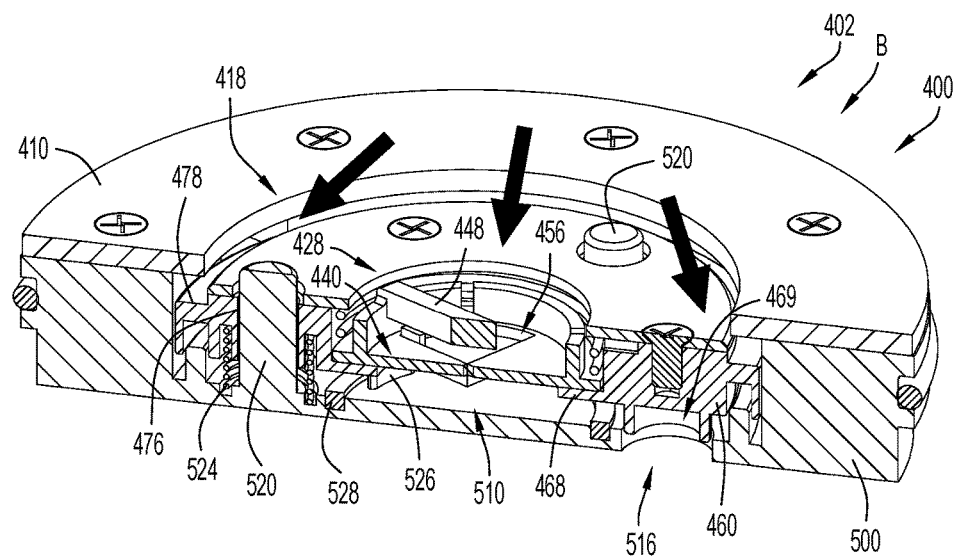
Figure 11C:
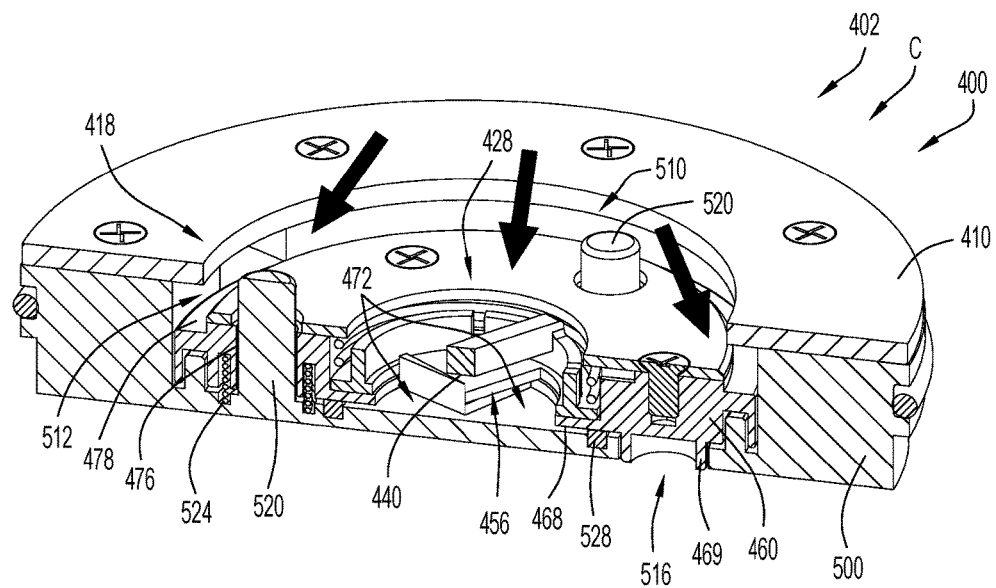

As illustrated in FIGS. 11B and 11C, when air is forced onto the top side 402 of the rotary disc mechanism 400 (i.e., air impacts the top side 402 of the rotary disc mechanism 400), the force of the air causes the piston 460 to slide downwardly through the central cavity 510 of the base 500 such that the bottom side 468 of the piston 460 moves toward the surface of the central cavity 510 of the base 500. FIG. 11B illustrates stage B, where the piston 460 has traveled along the central cavity 510 of the base 500 approximately 50% of the possible travel distance, while FIG. 11C illustrates stage C, where the piston 460 has traveled along the central cavity 510 of the base 500 approximately 100% of the possible travel distance. Because the rotary disc mechanism 400 forms a seal within the cavity 132 of the SLC 100, and because the air ports 456 of the rotary disc 440 are not aligned with the air ports 472 of the cavity 470, the air is able to force movement of the piston 460 along the guide pins 520 of the central cavity 510 of the base 500.

As illustrated, the bottom surface 468 of the piston 460 includes a series of bosses 469 that extend downwardly from the bottom surface 468. The bosses 469 of the piston 460 are aligned with the inner openings 516 of the central cavity 510 of the base 500. Thus, as the piston 460 moves from the position in stage A to the position in stage C, the bosses 469 slide into the inner openings 516 of the central cavity 510 of the base 500 to form a seal with the inner openings 516. Furthermore, as the piston 460 moves from the position in stage A to the position in stage C, the depression 478 of the piston 460 moves away from the top cover 410, such that the piston 460 moves downwardly past the outer openings 512. Once the outer openings 512 are exposed, the air being imparted onto the top side 402 of the rotary disc mechanism 400 travels through the outer openings 512, and into the channels 262(1), 262(2) of the second adapter member 250 to launch the first miniature sonobuoy 300(1) from the first adapter member 210, as previously explained.

FIG. 11C further illustrates that, when the rotary disc mechanism 400 is in stage C, the bottom surface 468 of the piston 460 is in contact with the gasket ring 528. In addition, when in stage C, the tabs 526 of the central cavity 510 of the base 500 extend upwardly through the slots 474 of the cavity 470 of the piston 460 and into abutment with the tabs 452 of the bottom side 450 of the rotary disc 440. As the tabs 526 of the central cavity 510 of the base 500 slide upward though the slots 474, the tabs 452 of the bottom side 450 of the rotary disc 440 slide out of engagement with the slots 474 of the cavity 470 of the piston 460. Once disengaged from the slots 474 of the cavity 470 of the piston 460, the torsional spring 430 forces the rotary disc 440 to rotate into the unlocked position, where the air ports 456 of the rotary disc 440 are in alignment with the air ports 472 of the cavity 470 of the piston 460. The walled member 473 prevents over rotation of the rotary disc 440 and ensures that air ports 456, 472 become aligned with one another. However, because the bottom surface 468 of the piston 460 is in abutment with the gasket ring 528 when the rotary disc mechanism 400 is in stage C, even though the rotary disc 440 is rotated to the unlocked position, air is still diverted through the outer openings 512. In other words, the first burst of air causes the inner air ports 472 to be "opened" (i.e., an inner air passage is formed), but the first burst of air does not flow through the air ports 472 due to the position of the piston 460 and the engagement of the bottom surface 468 of the piston 460 with the gasket ring 528.

Figure 11D:
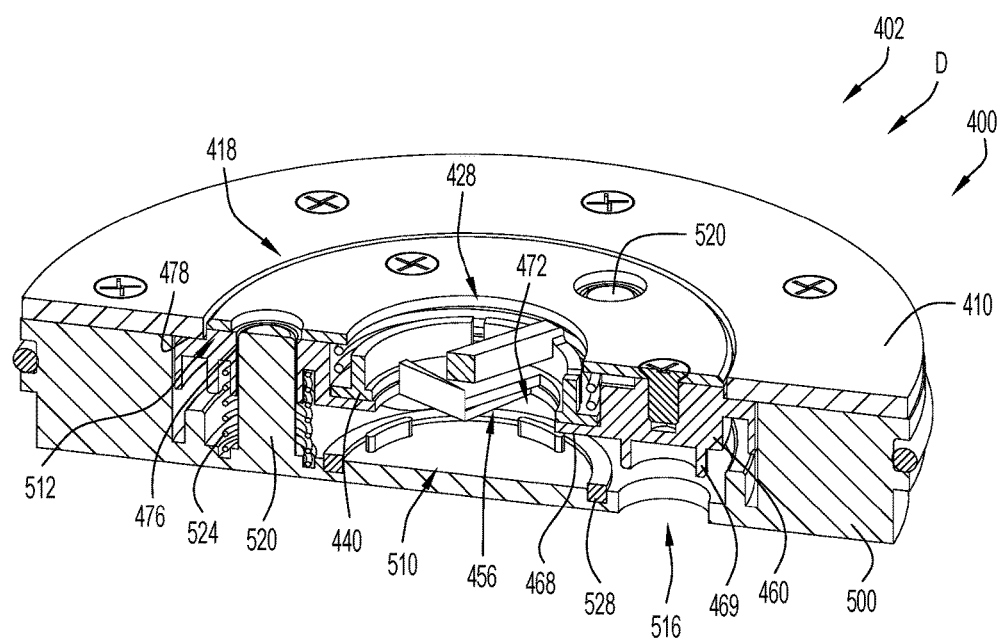

As illustrated in FIG. 11D, once the flow of air from the first burst of air has ended, the rotary disc mechanism 400 is oriented to stage D, where the resilient members 524 have returned the piston 460 to the top position within the central cavity 510 of the base 500 so that the depression 478 of the piston 460 is in abutment with the top cover 410. Moreover, in stage D, the bottom surface 468 of the piston 460 is spaced from the gasket ring 528, and the bosses 469 are no longer disposed within the inner openings 516 of the central cavity 510 of the base 500. However, unlike stage A, where the rotary disc 440 is in the locked position (i.e., the air ports 456 of the rotary disc 440 are not in alignment with the air ports 472 of the cavity 470 of the piston 460), when in stage D, the rotary disc 440 is in the unlocked position (i.e., air ports 456 of the rotary disc 440 are in alignment with the air ports 472 of the cavity 470 of the piston 460).

Figure 11E:
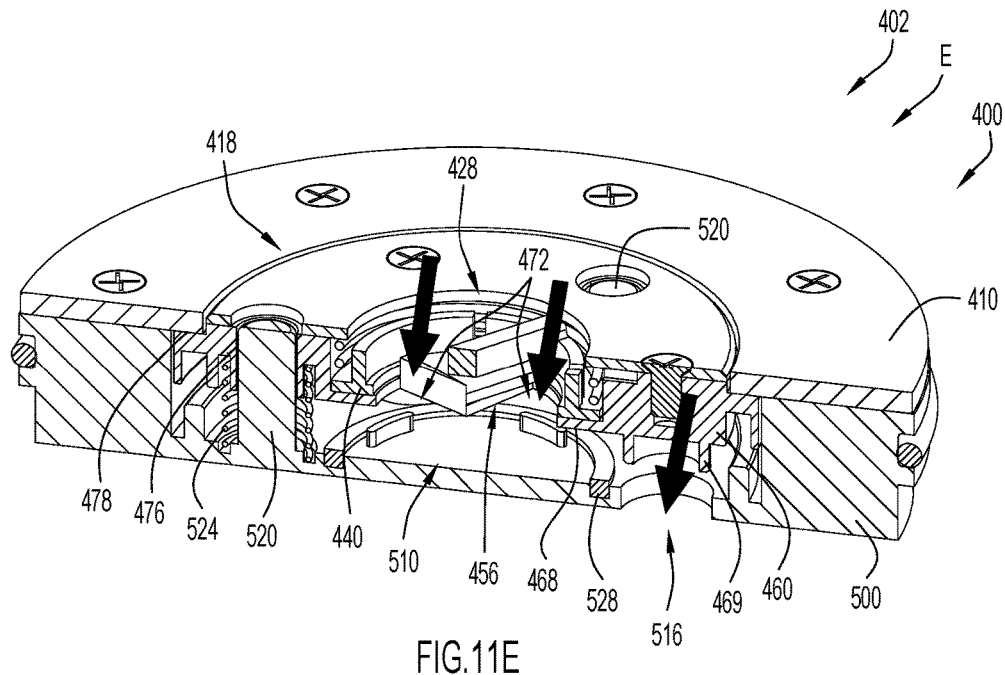
Figure 11F:
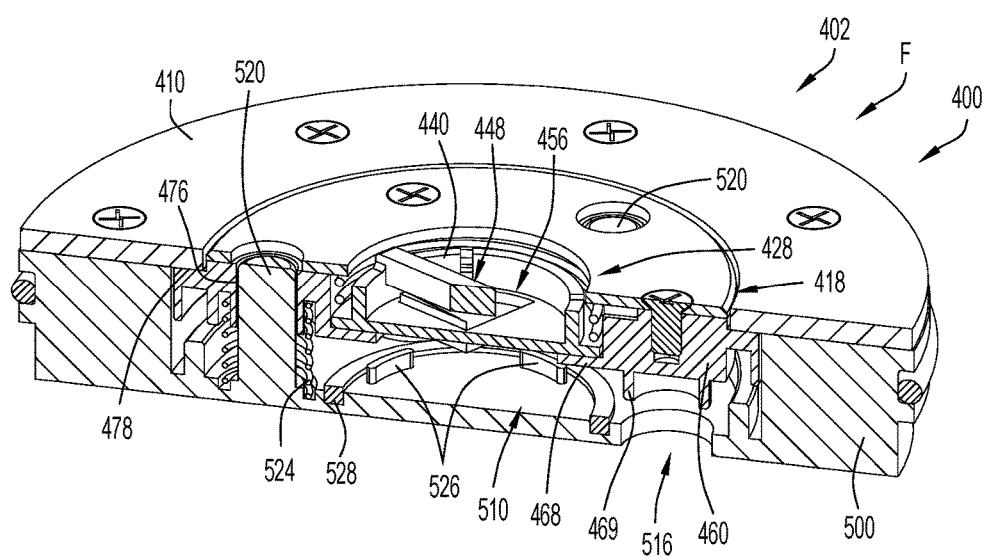

Thus, as illustrated in FIG. 11E, when the second burst of air from the pneumatic launching mechanism imparts air onto the top side 402 of the rotary disc mechanism 400, the air is capable of flowing through the air ports 456 of the rotary disc 440 and the air ports 472 of the cavity 470 of the piston 460 because the air ports 456, 472 are aligned with one another. The air is free to flow through the air ports 456, 472, into the central cavity 510 of the base 500, and through the inner openings 516 of the central cavity 510 of the base 500. As previously explained, when the air flows through the inner openings 516 of the central cavity 510 of the base 500, the air flows into the central passage 258 of the second adapter member 250 to launch the second miniature sonobuoy 300(2) from the second adapter member 250. As illustrated in FIG. 11F, after the flow of air from the second burst of air has ended, the rotary disc 440 may be rotated back into the locked position, where the tabs 452 are disposed in, and engaged with, the slots 474 of the cavity 470 of the piston 460. Thus, the rotary disc 440 and the rotary disc mechanism 400 can be reconfigured to subsequently launch two more miniature sonobuoys 300(1), 300(2) once they are loaded within the first and second adapter members 210, 250 disposed within the SLC 100.

Figure 12:
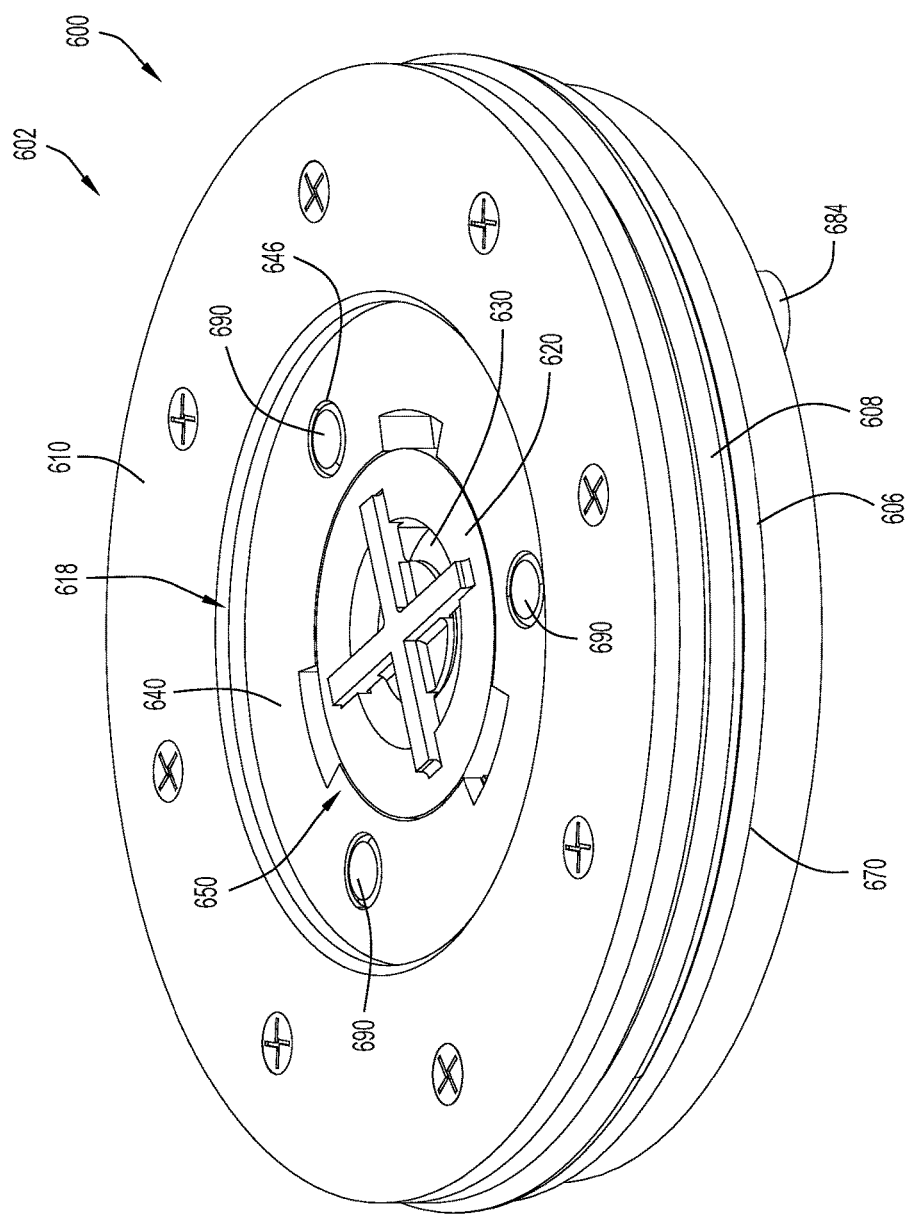
FIG. 12 illustrates a perspective view of the second embodiment of the pneumatic air diverter valve of the embodiment of the miniature sonobuoy adapter kit illustrated in FIG. 2.
Figure 13:
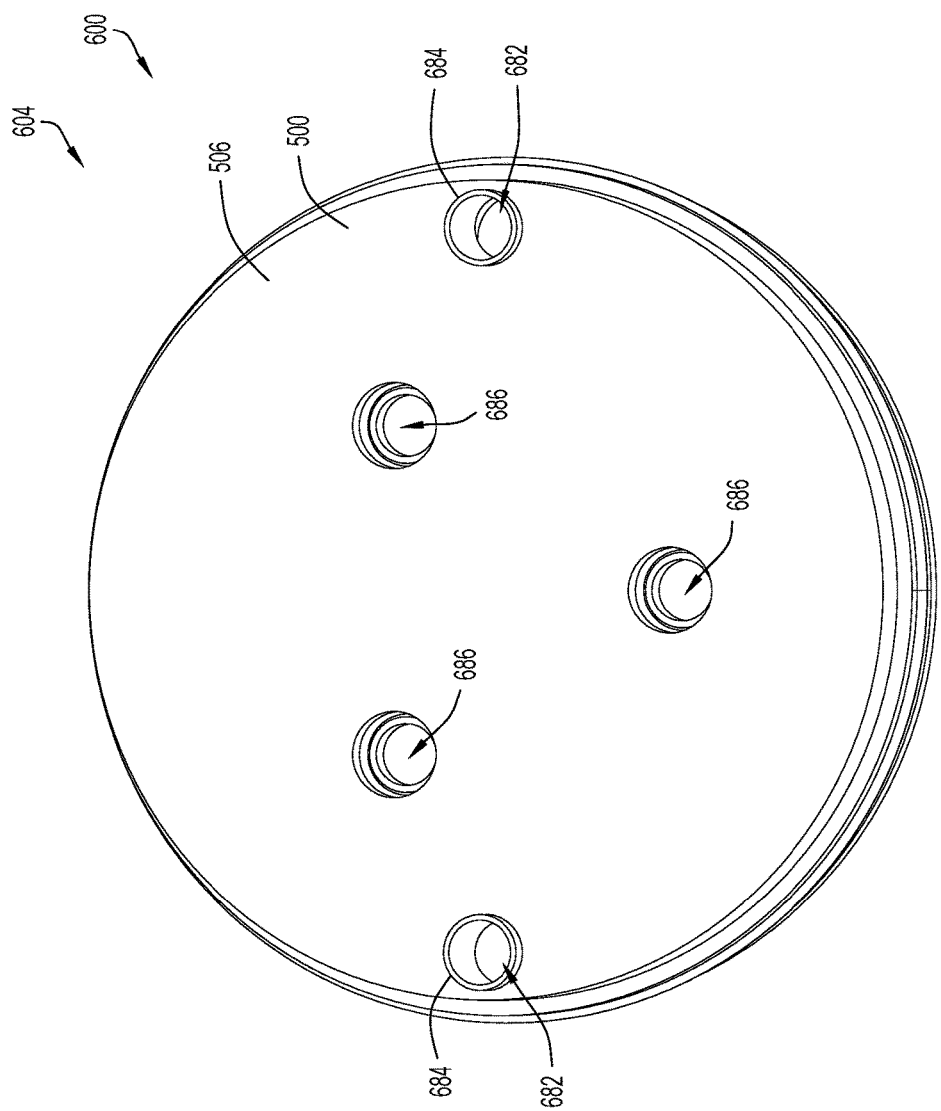
FIG. 13 illustrates a bottom view of the second embodiment of the pneumatic air diverter valve illustrated in FIG. 12.

Turning to FIGS. 12-16, and 17A-17F, illustrated is a second embodiment of the diverter mechanism 290, where the diverter mechanism 290 is a burst disc mechanism 600. As illustrated in FIGS. 12 and 13, the burst disc mechanism 600 is substantially disc-shaped with a top side 602, an opposite bottom side 604, and a sidewall 606 spanning between the top side 602 and the bottom side 604. As best illustrated in the exploded view of FIG. 14, the burst disc mechanism 600 is collectively formed from a plurality of components, including, a base 670, a piston 640, a burst disc 630, a retainer 620, and a top cover 610.

Figure 14:
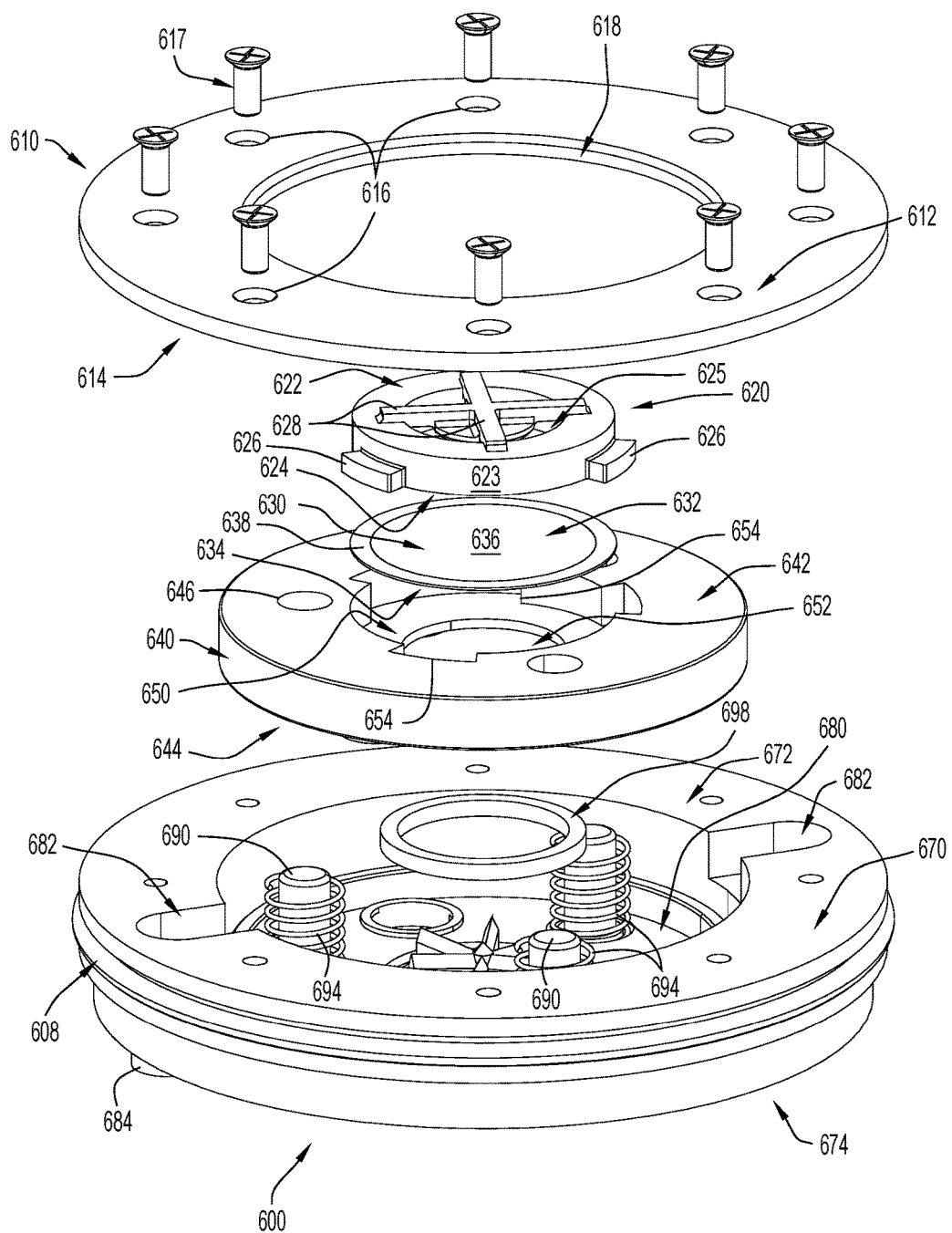
FIG. 14 illustrates an exploded view of the second embodiment of the pneumatic air diverter valve illustrated in FIG. 12.
Figure 15:
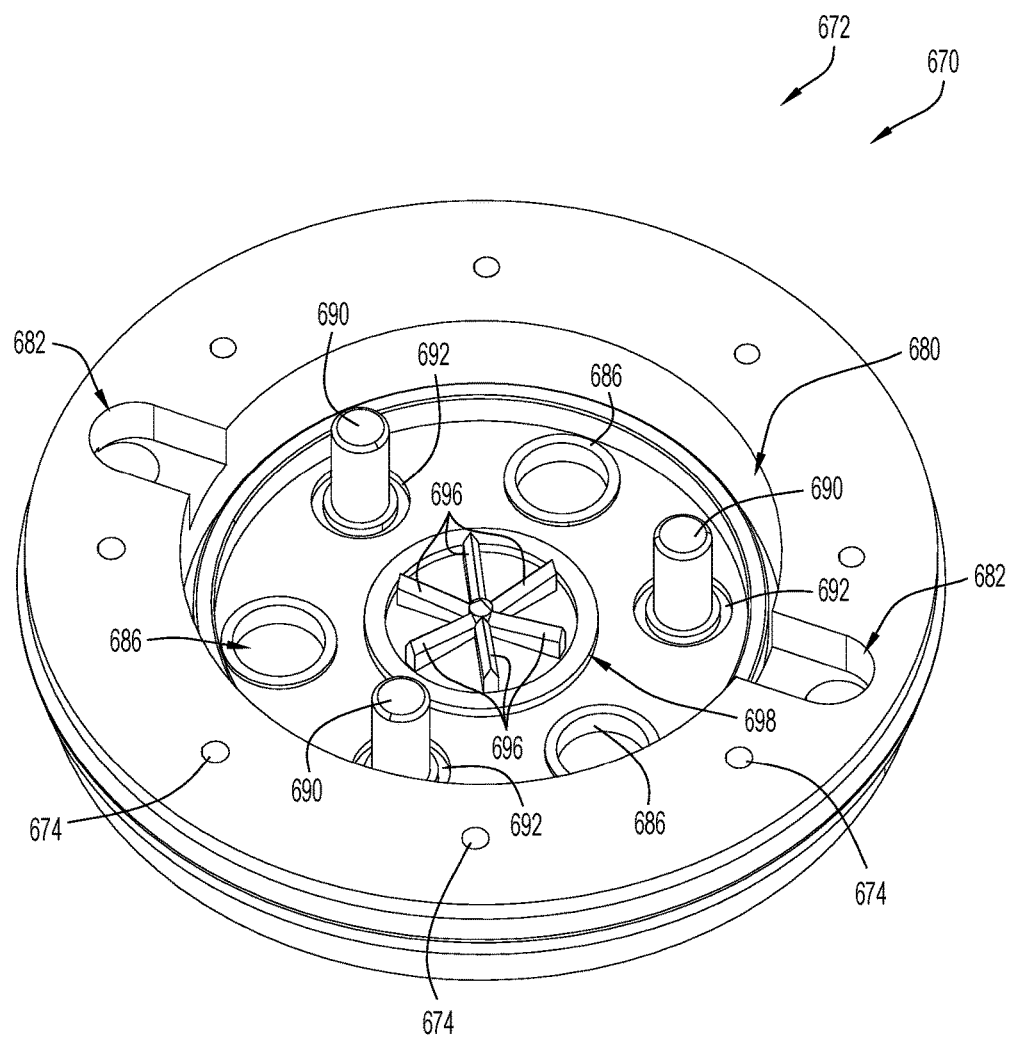
FIG. 15 illustrates a perspective view of a base portion of the second embodiment of the pneumatic air diverter valve illustrated in FIG. 12.

The base 670, as illustrated in FIGS. 14 and 15, includes a top side 672, a bottom side 676, and a sidewall 678 spanning between the top side 672 and the bottom side 676. The base 670 of the burst disc mechanism 600 is substantially similar to the rotary disc mechanism 400. As illustrated in FIG. 13, the bottom side 676 of the base 670 serves as the bottom side 604 of the burst disc mechanism 600. Furthermore, the sidewall 678 of the base 600 serves primarily as the sidewall 606 of the burst disc mechanism 600. Returning to FIG. 15, centrally disposed within the top side 672 of the base 670 is a central cavity 680. Furthermore, also disposed within the top side 672 of the base 670 is a plurality of apertures 674, where the apertures 674 are oriented annularly around the central cavity 680. As further explained below, the annular apertures 674 are configured to at least partially receive the fastener 617 of the top cover 610.

FIG. 15 further illustrates that a pair of outer openings 682 are disposed in the top side 672 of the base 670 such that the outer openings 682 are in fluid communication with the central cavity 680. As best illustrated in FIGS. 13 and 15, the outer openings 682 extend through the base 670 from the top side 672 to the bottom side 676. FIG. 13 illustrates that each of the outer openings 682 includes a boss or flange 684 that extends from the bottom side 676 of the base 670 proximate to, and disposed around, the outer openings 682. When the bottom surface 676 of the base 670 of the burst disc mechanism 600 is in abutment with the second end 254 of the second adapter member 250, the bosses 684 of the outer openings 682 are configured to be at least partially disposed within the proximal ends 266(1), 266(2) of the channels 262(1), 262(2) such that the outer openings 682 of the base 670 are in fluid communication with the channels 262(1), 262(2) of the second adapter member 250. Thus, the bosses 684 are configured to align the base 670, and as a result, the burst disc mechanism 600, with the second adapter member 250 such that the outer openings 682 are in fluid communication with the channels 262(1), 262(2) of the second adapter member 250. In addition, the bosses 684 are also configured to form a seal between the channels 262(1), 262(2) of the second adapter member 250 and the outer openings 682 such that, as air received by the burst disc mechanism 600 is diverted through the outer openings 682 and into the channels 262(1), 262(2) of the second adapter member 250, air does not escape between the burst disc mechanism 600 and the second adapter member 250.

As best illustrated in FIG. 15, disposed within the central cavity 680 of the base 670 are a series of inner openings 686. In the embodiment illustrated in FIGS. 14 and 15, the central cavity 680 of the base 670 includes three inner openings 686 that extend through the central cavity 680 to the bottom side 676 of the base 670. Like the rotary disc mechanism 400, when the bottom surface 676 of the base 670 of the burst disc mechanism 600 is in abutment with the second end 254 of the second adapter member 250, the inner openings 676 are aligned with the central passage 258 of the second adapter member 250 such that the inner openings 686 are in fluid communication with the central passage 258. The inner openings 686 are equally spaced around the periphery of the central cavity 680, where the inner openings 686 are offset from one another by approximately 120 degrees around the periphery of the central cavity 680.

Also disposed within the central cavity 680 of the base 670 is a series of piston guide pins 690. In the embodiment illustrated in FIGS. 14 and 15, the central cavity 680 of the base 670 includes three guide pins 690 that extend upwardly through the central cavity 680 toward the top side 672 of the base 670. Like the inner openings 686, the guide pins 690 are equally spaced around the periphery of the central cavity 680 where the guide pins 690 are offset from one another by approximately 120 degrees around the periphery of the central cavity 680. As further illustrated, each guide pin 690 is disposed between two inner openings 686 along the periphery of the central cavity 680 such that the guide pins 690 and the inner openings 686 are oriented in an alternating fashion around the periphery of the central cavity 680. Disposed around the base (i.e., the coupling of the guide pins 690 to the central cavity 680) of each guide pin 690 is a groove or depression 692. Furthermore, as best illustrated in FIG. 14, a resilient member or spring 694 is disposed around each of the guide pins 690. Each resilient member 694 is positioned around its respective guide pin 690 and at least partially disposed within the groove 692. Thus, grooves 692 retain each resilient member 694 in position around the guide pins 690.

Continuing with FIG. 15, the central cavity 680 of the base 670 also includes a plurality of protrusions or punch blades 696 disposed centrally within the central cavity 680. In the embodiment illustrated in FIG. 15, the central cavity 680 includes six radial protrusions 696 that are coupled to one another in a star-like formation. Other embodiments of the base 670 may contain any number of protrusions 696, and the protrusions may be oriented within the central cavity 680 of the base 670 in any shape or orientation. Furthermore, the protrusions 696 are centrally disposed inward from the guide pins 690 and the inner openings 686. The protrusions 696 extend upwardly through the central cavity 680 toward the top side 672 of the base 670. FIG. 15 further illustrates a seal or gasket ring 698 centrally disposed within the central cavity 680, and around the protrusions 696. Moreover, the gasket ring 698 is also disposed radially inward from the guide pins 690 and the inner openings 686 (i.e., the gasket ring 698 is more centrally disposed than the guide pins 690 and the inner openings 686.

Turning to FIG. 14, illustrated is the piston 640 of the burst disc mechanism 600. As best illustrated in FIG. 14, the piston 640 is configured to be slidably disposed within the central cavity 680 of the base 670. Thus, the piston 640 is approximately the same diameter as that of the central cavity 680. However, as will be further detailed below, the height or thickness of the piston 640 is less than that of the height or depth of the central cavity 680 of the base 670. The piston 640 is substantially disc-shaped with a top side 642 and a bottom side 648. Similar to the piston 460 of the rotary disc mechanism 400, disposed centrally within the top side 642 of the piston 640 is a cavity 650. Also disposed in the top side 642 of the piston 640 is a plurality of openings 646, where the openings 646 are oriented annularly around the cavity 650. The annular openings 646 extend through the piston 640 from the top side 642 to the bottom side 648. The annular openings 646 are configured to slidably receive the piston guide pins 690 of the base 670. Thus, the piston 640 slides along the piston guide pins 690 of the base 670 (i.e., the guide pins 690 slide through the annular openings 646) when the piston 640 moves up and down through the central cavity 680 of the base 670.

As best illustrated in FIG. 14, the cavity 650 of the piston 640 is substantially circular and includes a central opening 652 and three L-shaped locking grooves 654 extending outward from the circular profile of the sidewall of the cavity 650. The central opening 652 is concentrically centered within the cavity 650 of the piston 640 and extends through the cavity 650 to the bottom side 648 of the piston 640. In addition, the L-shaped grooves 654 are equally spaced around the periphery of the cavity 650 such that the grooves 654 are offset from one another by approximately 120 degrees around the periphery of the cavity 650. The L-shaped grooves 654 contain an upper, vertical section and a lower, horizontal section. The upper vertical section of each groove 654 is open to the top surface of piston 640 and is configured to receive a flange inserted from the top surface. The upper vertical section of each groove has a horizontal cross section that corresponds to the horizontal cross-sectional shape of the flange such that the flange can travel from the top to the bottom of the groove when inserted vertically. The lower horizontal section of each groove 654 has a larger horizontal cross section than the upper vertical section and a vertical height sufficient to receive the flange. The lower horizontal section of each groove 654 is config- ured to receive a flange traveling through the bottom of the upper vertical section such that horizontal rotation of the flange causes it to lodge in the horizontal section of groove 654 to lock the flange in place.

Continuing with FIG. 14, the burst disc mechanism 600 further includes a burst disc 630 that is configured to be disposed within the cavity 650 of the piston 640. As illustrated, the burst disc 650 is substantially disc-shaped with a top side 632 and a bottom side 634. The burst disc 630 may have a diameter that is substantially equal to the diameter of the cavity 650 of the piston 640, and at least larger than the diameter of the central opening 652. The burst disc 630 contains an inner portion 636 and an outer or border portion 638. The inner portion 636 may be constructed from, but is not limited to, a biaxially-oriented polyethylene terephthalate film. The outer portion 638 may be constructed from, but is not limited to, aluminum.

As further illustrated in FIG. 14, a retainer disc 620 is disposed within the cavity 650 of the piston 640 to retain the burst disc 630 within the cavity 650 of the piston 640. As illustrated, the retainer disc 620 of the burst disc mechanism 600 is approximately the same diameter as that of the cavity 650 of the piston 640 such that the retainer disc 620 is configured to fit within cavity 650 of the piston 640. The retainer disc 620 is substantially disc-shaped with a top side 622, a bottom side 624, and a sidewall 623 spanning between the top side 622 and the bottom side 624. The retainer disc 620 further includes a centrally disposed opening 625 that extends through the retainer disc 620 from the top side 622 to the bottom side 624. As further illustrated in FIG. 14, extending outwardly from the sidewall 623 of the retainer disc 620 proximate to the bottom side 624 are a plurality of flanges 626. The flanges 626 are offset from one another approximately 120 degrees around the sidewall 623 of the retainer disc 620. Furthermore, the flanges 626 are substantially equivalent in width to that of the grooves 654 of the cavity 650 of the piston 640, such that, when the retainer disc 620 is inserted into the cavity 650 of the piston 640, the flanges 626 are inserted through the vertical section of the grooves 654. Once inserted into the cavity 650 of the piston 640 so that the bottom surface 624 of the retainer disc 620 abuts the top surface 632 of the burst disc 630 as the bottom surface 634 of the burst disc 630 abuts the bottom of the cavity 650 of the piston 640, the retainer disc 620 may be rotated such that the flanges 626 slide into the horizontal sections of the grooves 654 of the cavity 650 of the piston 640 to lock the retainer disc 620, and ultimately the burst disc 630, into the cavity 650 of the piston 640. FIG. 14 further illustrates that the top side 622 includes a pair of cross-members 628 that extend across the top side 622 and the central opening 625, where the cross-members 628 intersect one another to form an X-shape on the top side 622 of the retainer disc 620.

In addition, FIG. 14 also illustrates a top cover 610 that is configured to be disposed on, and coupled to, the base 670. The top cover 610 is disc-shaped with a top side 612 and a bottom side 614. As illustrated, the top cover 610 includes a central opening 618 that extends through the top cover 610 from the top side 612 to the bottom side 614. The central opening 618 of the top cover 610 contains a diameter that is slightly smaller than the diameter of the central cavity 610 of the base 670 and the diameter of the piston 640. When the bottom side 614 of the top cover 610 is disposed on the top side 672 of the base 670, the bottom side 614 of the top cover 610 at least partially covers the top side 642 of the piston 640.

The top cover 610 also includes a series of apertures 616 that are oriented annularly around the central opening 618 of the top cover 610. The annular apertures 616 of the top cover 610 are configured to align with the annular apertures 674 disposed on the top side 672 of the base 670. Thus, when the bottom side 614 of the top cover 610 is disposed on the top side 672 of the base 670, fasteners 617 (e.g., screws, pins, bolts, etc.) may be inserted through the annular apertures 616 of the top cover 610 and at least partially into the annular apertures 674 of the base 670 to secure the top cover 610 to the base 670. When the top cover 610 is secured to the base 670, the piston 640, burst disc 630, and retainer disc 620 are secured to the base 670 with the capability of sliding through the central cavity 680 of the base 670.

Returning to FIG. 12, the top side 602 of the burst disc mechanism 600 is collectively formed from the top side 612 of the top cover 610, the top side 642 of the piston 640, the ends of the guide pins 690, and the retainer disc 620. As illustrated, the burst disc 630 is visible through the central opening 625 of the retainer disc 620, while the ends of the guide pins 690 are visible through the annular openings 646 of the piston 640. In addition, the retainer disc 620, burst disc 630, piston 640, and guide pins 690 are visible through the central opening 618 of the top cover 610.

Turning to FIG. 16, illustrated is the burst disc mechanism 600 disposed within the cavity 132 of the SLC 100 proximate to the second end 120 of the SLC 100, where the SLC 100 is illustrated with a cutaway portion that is for illustrative purposes only. When disposed within the cavity 132, the O-ring 608 of the burst disc mechanism 600 forms a seal along the inner surface of the sidewall 130 that forms the cavity 132. Moreover, the retainer disc 620 is disposed proximate to, and in fluid communication with, the aperture 122 of the second end 120 of the SLC 100 such that air is capable of traveling through the apertures 122 of the second end 120 of the SLC 100 and into the burst disc mechanism 600 via the central opening 625 of the retainer disc 620 and the piston 640.

Figure 17A:
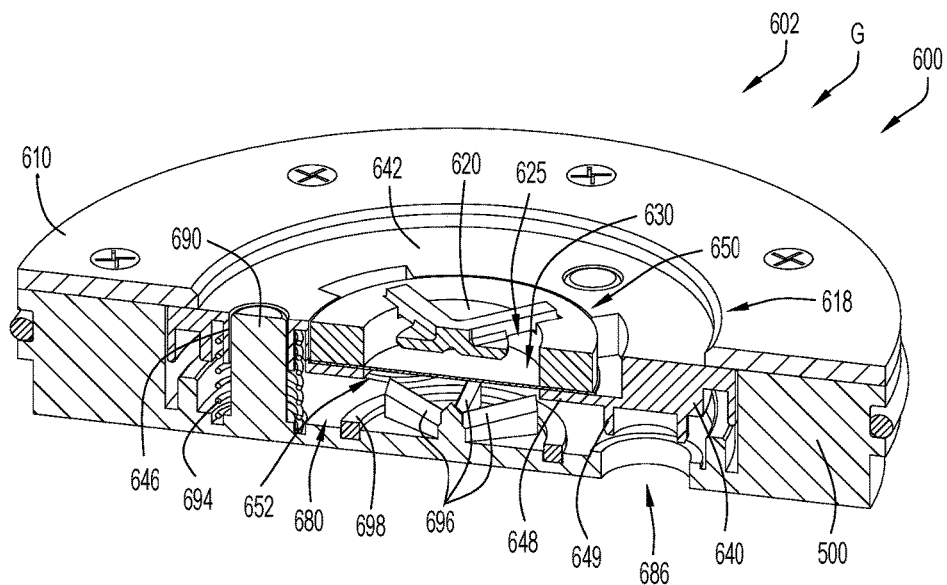
FIGS. 17A-17F illustrate cross-sectional view of the operational stages of the second embodiment of the pneumatic air diverter valve illustrated in FIG. 12.

FIGS. 17A-17F illustrate the cross-sectional views of the operation and various positions of the components of the burst disc mechanism 600 during the various stages of launching two miniature sonobuoys 300(1), 300(2), as illustrated in FIGS. 3A-3D. As illustrated in FIG. 17A, the burst disc mechanism 600 is oriented in static position G, which occurs prior to the burst disc mechanism 600 receiving a first burst of air from the pneumatic launching mechanism. As illustrated in FIG. 17A, the resilient members 694 disposed around the guide pins 690 bias the piston 640 towards an upward position within the central cavity 680 of the base 670, where the top side 642 of the piston 640 is in abutment with the top cover 610. Moreover, in this first static position G, the burst disc 630 forms a seal across the central opening 652 of the cavity 650 of the piston 640, where the burst disc 630 is retained in the cavity 650 by the retainer disc 620. As previously explained, the retainer disc 620 may be inserted into the cavity 650 of the piston 640, where the flanges 626 on the sidewall 623 of the retainer disc 620 align with the grooves 654 of the cavity 650 of the piston 640. Once fully inserted into the cavity 650 of the piston 640, the retainer disc 620 may be rotated within the cavity 650 of the piston 640 so that the flanges 626 slide into the horizontal sections of the grooves 654, which locks the retainer disc 620 into the cavity 650 of the piston 640. This secures the burst disc 630 in the cavity 650 of the piston 640 between the bottom side 624 of the retainer disc 620 and the base of the cavity 650 of the piston 640 (i.e., the burst disc 630 forms a seal over the central opening 652 of the cavity 650 of the piston 640).

Figure 17B:
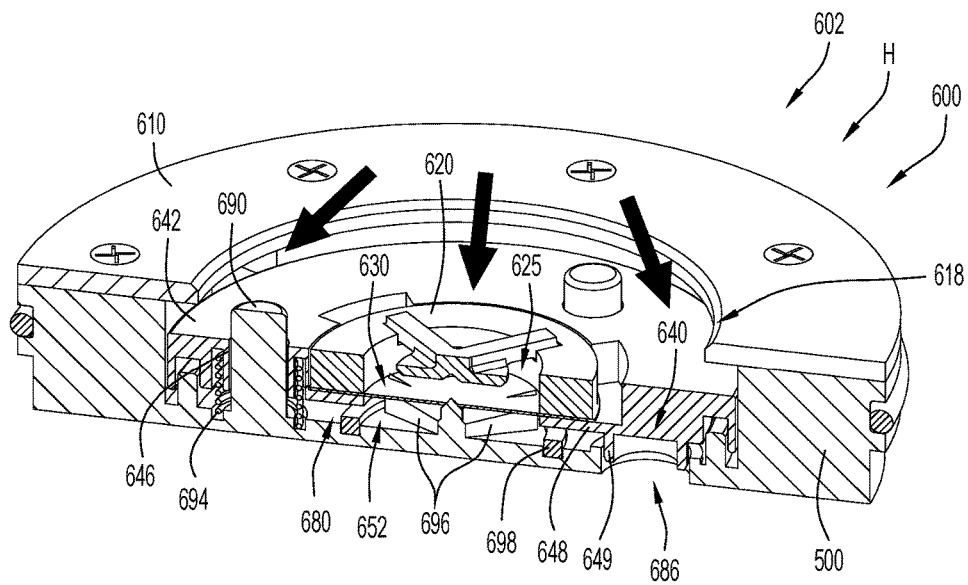
Figure 17C:
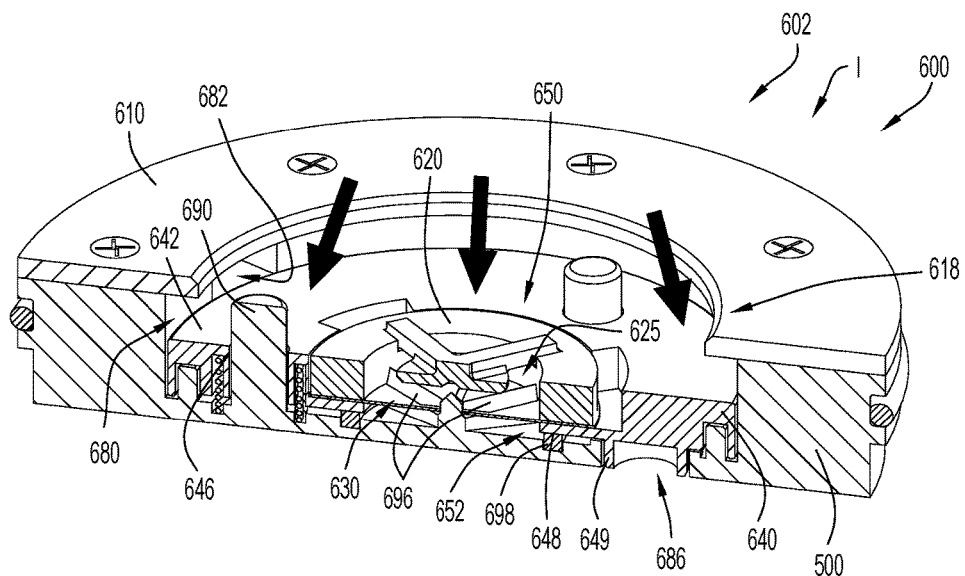

As illustrated in FIGS. 17B and 17C, when air is forced onto the top side 602 of the burst disc mechanism 600 (i.e., air impacts the top side 602 of the burst disc mechanism 600), the force of the air causes the piston 640 to slide downwardly through the central cavity 680 of the base 670 such that the bottom side 648 of the piston 640 moves toward the surface of the central cavity 680 of the base 670. FIG. 17B illustrates the position H of the piston 640, where the piston 640 has traveled along the central cavity 680 of the base 670 approximately 50% of the possible travel distance, while FIG. 17C illustrates the position I of the piston 640, where the piston 640 has traveled along the central cavity 680 of the base 670 approximately 100% of the possible travel distance. Because the burst disc mechanism 600 forms a seal within the cavity 132 of the SLC 100, and because the burst disc 630 forms a seal over the central opening 652 of the piston 640, the air is able to force movement of the piston 640 along the guide pins 690 of the central cavity 680 of the base 670.

As illustrated, the bottom surface 648 of the piston 640 includes a series of bosses 649 that extend downwardly from the bottom surface 648. The bosses 649 of the piston 640 are aligned with the inner openings 686 of the central cavity 680 of the base 670. Thus, as the piston 640 moves from position G to position H, the bosses 649 slide into the inner openings 686 of the central cavity 680 of the base 670 to form a seal with the inner openings 686. Furthermore, as the piston 640 moves from position G to position H, the top side 642 of the piston 640 moves away from the top cover 610, such that the top side 642 of the piston 640 moves downwardly past the outer openings 682. Once the outer openings 682 are exposed, the air being imparted onto the top side 602 of the burst disc mechanism 600 travels through the outer openings 682, and into the channels 262(1), 262(2) of the second adapter member 250 to launch the first miniature sonobuoy 300(1) from the first adapter member 210, as previously explained.

FIG. 17C further illustrates that, when the burst disc mechanism 600 is in position I, the bottom surface 648 of the piston 640 is in contact with the gasket ring 698. In addition, when in position I, the protrusions 696 of the central cavity 680 of the base 670 are forced through the burst disc 630 (i.e., the protrusions 696 of the central cavity 680 of the base 670 punch through or puncture the burst disc 630). More specifically, when the burst disc mechanism 600 is in position I, the protrusions 696 of the central cavity 680 of the base 670 extend upwardly through the central opening 652 of the piston 640 such that the protrusions puncture the burst disc 630 disposed within the cavity 650 of the piston 640. This causes the burst disc 630 to no longer form a seal over the central opening 652 of the cavity 650 of the piston 640. In other words, the first burst of air causes the burst disc 630 to rupture, creating a central air passage through central opening 652, but the first burst of air does not flow through the central opening 652 due to the position of the piston 640 and the engagement of the bosses 649 and the inner openings 686 of the central cavity 680 of the base 670.

Figure 17D:
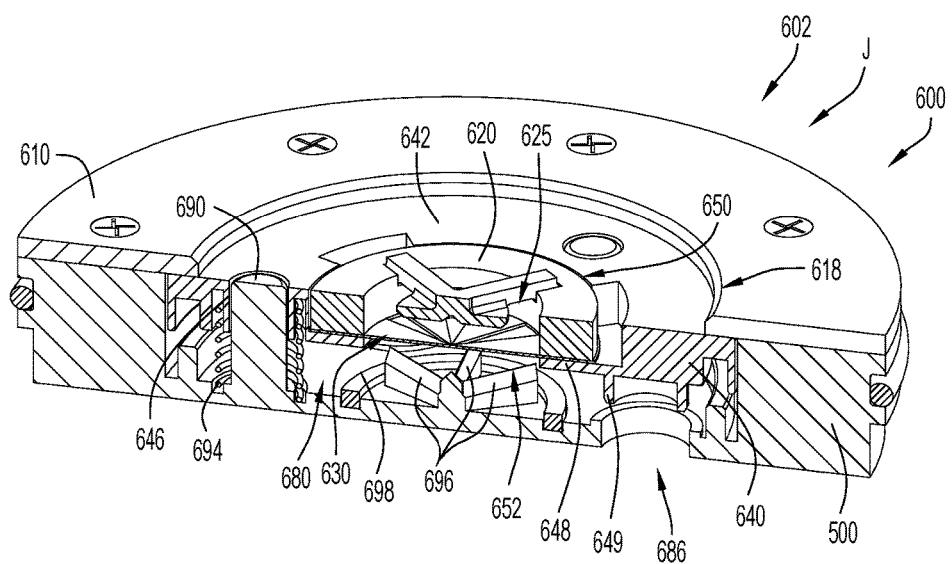

As illustrated in FIG. 17D, once the flow of air from the first burst of air has ended, the burst disc mechanism 600 is oriented in position J, where the resilient members 694 have returned the piston 640 to the top position within the central cavity 680 of the base 670 so that the top side 642 of the piston 640 is in abutment with the top cover 610. Moreover, in position J, the bottom surface 648 of the piston 640 is spaced from the gasket ring 698, and the bosses 649 are no longer disposed within the inner openings 686 of the central cavity 680 of the base 670. However, unlike position G, where the burst disc 630 is not punctured and forms a seal over the central opening 652 of the piston 640, when in position J, the burst disc 630 is punctured and no longer forms a seal over the central opening 652 of the piston 640.

Figure 17E:
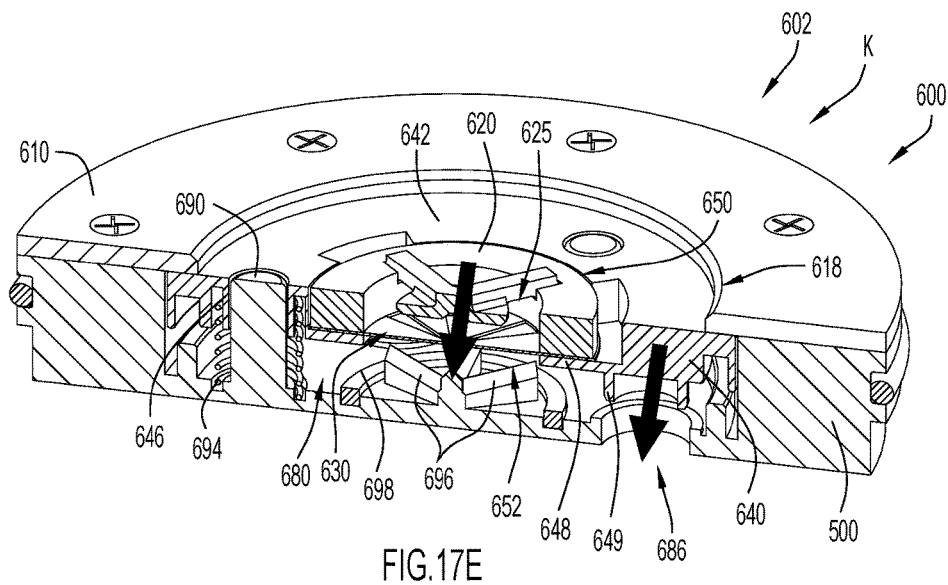

Thus, as illustrated in FIG. 17E, when the second burst of air from the pneumatic launching mechanism imparts air onto the top side 602 of the burst disc mechanism 600, the air is capable of flowing through the opening 625 of the retainer disc 620 and through the central opening 652 of the cavity 650 of the piston 640 because of the punctured openings in the burst disc 630. The air is free to flow through the opening 625 of the retainer disc 620, the punctured openings in the burst disc 630, the central opening 652 of the cavity 650 of the piston 640, and into the central cavity 680 of the base 670, where the air exits the burst disc mechanism 600 via the inner openings 686 of the central cavity 680 of the base 670. As previously explained, when the air flows through the inner openings 686 of the central cavity 680 of the base 670, the air flows into the central passage 258 of the second adapter member 250 to launch the second miniature sonobuoy 300(2) from the second adapter member 250.

Figure 17F:
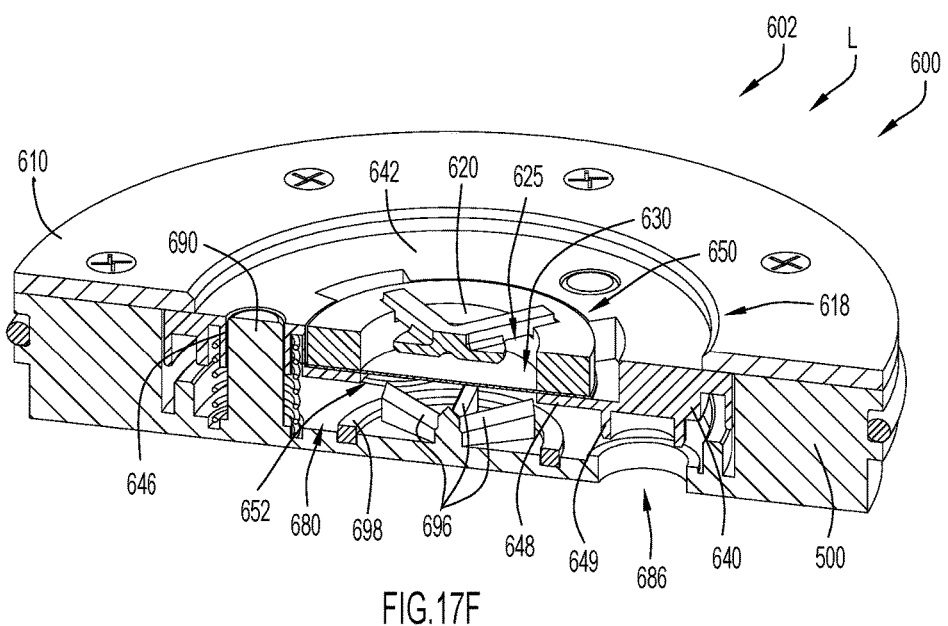

As illustrated in FIG. 17F, after the flow of air from the second burst of air has ended, the punctured burst disc 630 may be replaced by a new non-punctured burst disc 630. To replace the punctured burst disc 630, the retainer disc 620 is rotated within the cavity 650 of the piston 640 until the flanges 626 are aligned with the vertical sections of the grooves 654 of the cavity 650 of the piston 640. The retainer disc 620 may then be pulled out of the cavity 650 of the piston 640 to facilitate removal of the punctured burst disc 630 and insertion of a new non-punctured burst disc 630. Once the new burst disc 630 is inserted into the cavity 650 of the piston 640, the retainer disc 620 may be inserted into the cavity 650 of the piston 640. As previously explained, once fully inserted into the cavity 650 of the piston 640, the retainer disc 620 may be rotated within the cavity 650 of the piston 640 so that the flanges 626 slide into the horizontal sections of the grooves 654, which locks the retainer disc 620 into the cavity 650 of the piston 640 and secures the new burst disc 630 in the cavity 650 of the piston 640. Thus, the burst disc mechanism 400 can be reconfigured to subsequently launch two more miniature sonobuoys 300(1), 300(2) once they are loaded within the SLC 100 by simply exchanging the punctured burst disc 630 for a new burst disc 630.

Figure 18:
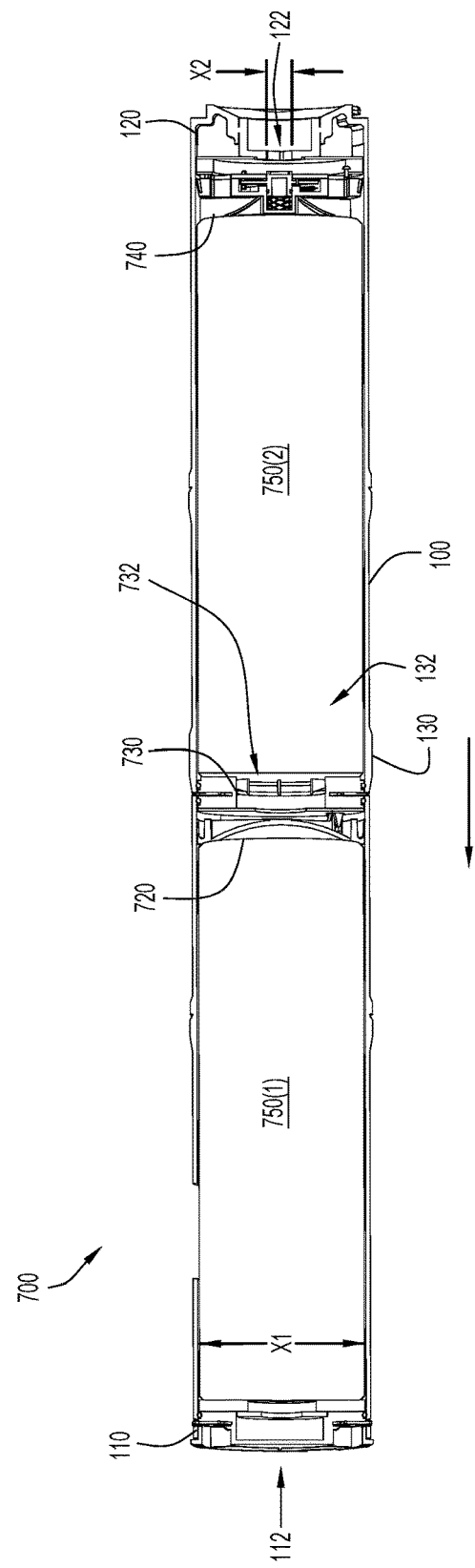
FIG. 18 illustrates a cross-sectional view of a standard sonobuoy launching container equipped with a G-size sonobuoy adapter kit according to the present disclosure.

Turning to FIG. 18, illustrated is an SLC 100 equipped with a G-size sonobuoy adapter kit 700 that is disposed within the SLC 100. As previously described, the SLC 100 is substantially cylindrical with a first end 110, an opposite second end 120, and a sidewall 130 spanning between the first and second ends 110, 120. The first end 110 of the SLC 100 includes a substantially circular opening 112 with a diameter of X1, while the second end 120 of the SLC 100 includes a substantially circular aperture 122 with a diameter of X2. The diameter X1 of the opening 112 is larger than the diameter X2 of the aperture 122. Moreover, the first end 110, the second end 120, and the sidewall 130 collectively define a cavity 132.

Figure 19A:
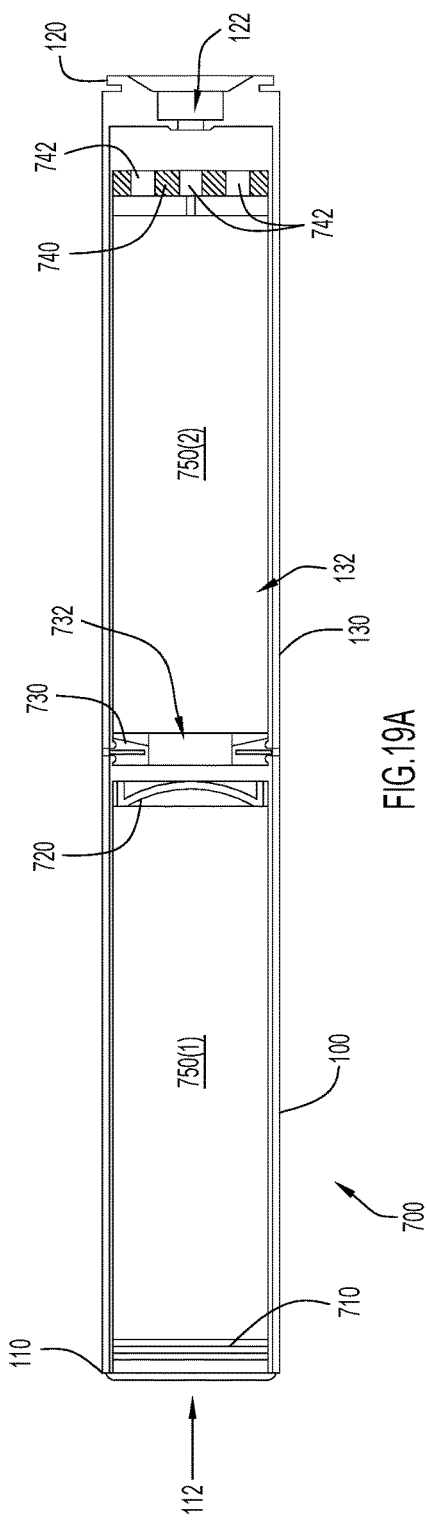

Aircraft may be equipped with multiple SLC's 100 configured to deploy or launch sonobuoys from the SLC's 100. As shown in FIGS. 18 and 19A, the G-size adapter kit 700 is disposed within the cavity 132 of the SLC 100 and enables the standard sized SLC's 100 to be loaded with two G-size sonobuoys 750(1), 750(2) without requiring the SLC's to be significantly altered or reconfigured (i.e., only a small localized area of the sidewalls 130 of the SLC 100 needs to be cut to create slots configured to receive the retainer clips).

Unlike adapter kit 200, the adapter kit 700 for the G-size sonobuoys may not comprise cylindrical tube adapter members. In one embodiment, the diameter X1 of the opening 112 and the cavity 132 may be approximately 5.000 inches, while the G-size sonobuoys 750(1), 750(2) may have a diameter of approximately 4.875 inches. Because the G-size sonobuoys are similar in diameter to that of A-size sonobuoys and are only shorter in length than A-size sonobuoys, the G-size adapter kit 700 may include only a first, or lower, endcap 710, a first, or lower, piston 720, a second, or upper, endcap 730, and a diverter mechanism 740. In some embodiments, the first endcap 710 and the first piston 720 may be the same components used from a standard SLC kit. The first endcap 710, the first piston 720, the second endcap 730, and the diverter mechanism 740 are disposed in-line with one another within the cavity 132 of the SLC 100. As further illustrated, the first endcap 710 may be disposed proximate to the first end 110 and within the opening 112 of the SLC 100, while the diverter mechanism 740 is disposed proximate to the second end 120 and the aperture 122 of the SLC 100. The first piston 720 and the second endcap 730 may be disposed proximate to one another, and may be disposed between the first endcap 710 and the diverter mechanism 740. As described herein, the adapter kit 700 enables an SLC 100 to independently launch each one of the two G-size sonobuoys 750(1), 750(2) from the SLC 100 via a pneumatic launching mechanism or other launching means (e.g., squib-based pyrotechnic launch mechanism).

The first endcap 710 and the first piston 720 may be disposed in the SLC 100, and more specifically, the cavity 132 of the SLC 100. Both the first endcap 710 and the first piston 720 are sized and shaped to fit within the cavity 132. The first endcap 710 and the first piston 720 may both be substantially disc-shaped with diameters substantially equal to the diameter X1 of the cavity 132 of the SLC 100. The first endcap 710 may be disposed in the cavity 132 proximate to, or within, the first end 110 of the SLC. The first piston 720 may be disposed in the cavity 132 between the first end 110 and the second end 120. In addition, a first G-size sonobuoy 750(1) is disposed within the cavity 132 of the SLC 100 between the first endcap 710 and the first piston 720. Similar to that of the endcap 240 of the miniature adapter kit 200, the first endcap 710 may include a series of retainer clips disposed around the perimeter or periphery of the first endcap 710. The retainer clips interact with the sidewalls 130 of the SLC 100 to temporarily retain the first endcap 710 within the first end 110 of the SLC 100. The retaining of the first endcap 710 in the first end 110 of the SLC 100 retains the first G-size sonobuoy 750(1) in the cavity 132 of the SLC 100.

In addition, the G-size adapter kit 700 may include the second endcap 730 and the diverter mechanism 740. Both the second endcap 730 and the diverter mechanism 740 are sized and shaped to fit within the cavity 132. As illustrated in FIGS. 18 and 19A, the second endcap 730 may be disposed within the cavity 132 of the SLC 100 such that the second endcap 730 is disposed proximate or adjacent to the first piston 720. The first piston 720 may be disposed more proximate to the first end 110 of the SLC 100 than the second endcap 730, while the second endcap 730 may be disposed more proximate to the second end 120 of the SLC 100 than the first piston 720. As further illustrated, the second endcap 730 may include a central opening 732. In other embodiments, the second endcap 730 may include multiple openings rather than a single central opening. Similar to the first endcap 710, the second endcap 730 may include a series of retainer clips disposed around the perimeter or periphery of the second endcap 730. The retainer clips interact with the sidewalls 130 of the SLC 100 to temporarily retain the second endcap 730 within the cavity 132 of the SLC 100. The retaining of the second endcap 730 in the cavity 132 of the SLC 100 retains the second G-size sonobuoy 750(2) in the cavity 132 of the SLC 100 proximate to the second end 120.

As further illustrated, the diverter mechanism 740 is disposed within the cavity 132 of the SLC 100 proximate to the second end 120 of the SLC. The second G-size sonobuoy 750(2) may be disposed between the second endcap 730 and the diverter mechanism 740. As will be further detailed below, the diverter mechanism 740 is capable of receiving a series of air bursts via a pneumatic launching mechanism (not shown) through the aperture 122 of the second end 120 of the SLC 100. The diverter mechanism 740 is configured to divert a first burst of air from the pneumatic launching mechanism around the second G-size sonobuoy 750(2) to launch the first G-size sonobuoy 750(1), and then act as a piston when the SLC 100 receives a subsequent second burst of air from the pneumatic launching mechanism in order to launch the second G-size sonobuoy 750(2).

FIGS. 19A-19D illustrate the launching stages of the G-size sonobuoys from the SLC 100 via the adapter kit 700. As previously explained, and as illustrated in FIG. 3A, prior to launching one of the G-size sonobuoys 750(1), 750(2) from the SLC 100, the first G-size sonobuoy 750(1) is disposed within the cavity 132 of the SLC 100 proximate to the first end 110, while the second G-size sonobuoy 750(2) is disposed within the cavity 132 of the SLC 100 proximate to the second end 120 of the SLC 100. The first endcap 710 retains the first G-size sonobuoy 750(1) and the first piston 720 within the SLC 100, while the second endcap 730 retains the second G-size sonobuoy 750(2) and the diverter mechanism 740 within the SLC 100. When launched, the G-size sonobuoys 750(1), 750(2) are expelled out from the first end 110 of the SLC 100 via the opening 112.

Figure 19B:
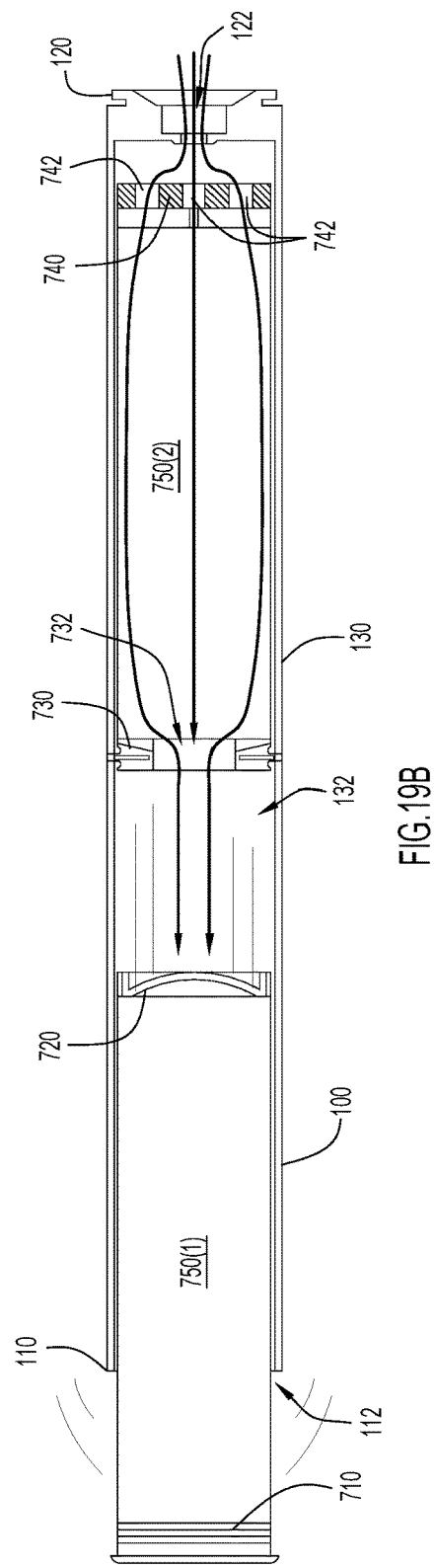

As illustrated in FIG. 19B, when the SLC 100 receives the first burst of air from the pneumatic launching mechanism, the air travels into the diverter mechanism 740 via the aperture 122 on the second end 120 of the SLC 100. The diverter mechanism 740 is initially set to divert the received first burst of air around the second G-size sonobuoys 750(2), through the opening 732 of the second endcap 730, and into the space between the second endcap 730 and the first piston 720. The first burst of air is configured to act on, or impart a force onto, the first piston 720, which causes the first piston 720 to apply a force onto the end of the first G-size sonobuoy 750(1), which subsequently imparts a force onto the first endcap 710. The pressure in the space between the second endcap 730 and the first piston 720 increases until the force imparted onto the first endcap 710 is enough to deform (e.g., bend, shear, etc.) the retainer clips that hold the first endcap 710 in the end 112 of the SLC 100. As illustrated in FIGS. 19A and 19B, when the diverter mechanism 740 receives the first burst of air from the pneumatic launching mechanism, apertures 742 of the diverter mechanism 740 are in an open position, allowing the first burst of air to travel through the apertures 742 of the diverter mechanism 740. Because the G-size sonobuoys 750(1), 750(2) are slightly smaller in diameter than the diameter X1 of the cavity 132, the first burst of air from the pneumatic launching mechanism is able to travel through the space between the exterior surface of the second G-size sonobuoy 750(2) and the interior surface of the sidewall 130 of the SLC 100, and eventually through the center opening 732 of the second endcap 730. This results in the first endcap 710, the first G-size sonobuoy 750(1), and the first piston 720 being launched or expelled from the cavity 132 of the SLC 100 via the opening 112 of the first end 110 of the SLC 100.

FIG. 19C illustrates the SLC 100 after the first G-size sonobuoy 750(1) has been launched. As illustrated, the SLC 100 no longer contains the first endcap 710, the first G-size sonobuoy 750(1), and the first piston 720 within the cavity 132. However, because the diverter mechanism 740 diverted the first burst of air through the space around the second G-size sonobuoy 750(2), and because the second endcap 730 contains an opening 732, the second G-size sonobuoy 750(2) is still disposed within the cavity 132 of the SLC 100. As previously explained, the second endcap 730 retains the second G-size sonobuoy 750(2) and the diverter mechanism 740 within the cavity 132 of the SLC 100. As further detailed below, after receiving the first burst of air, the diverter mechanism 740 resets to act as a piston (i.e., the apertures 742 are sealed) in order to receive a subsequent burst of air that acts on, or imparts a force onto, the diverter mechanism 740 in order to launch the second G-size sonobuoy 750(2).

As illustrated in FIG. 19D, when the SLC 100 receives the second burst of air from the pneumatic launching mechanism, the air travels to the diverter mechanism 740 via the aperture 122 on the second end 120 of the SLC 100. Because the apertures 742 of the diverter mechanism 740 are sealed as a result of the first burst of air, the diverter mechanism 740 acts as a piston when receiving the second burst of air. The second burst of air flows into the space between the diverter mechanism 740 and the second end 120 of the SLC 100, where pressure builds. The second burst of air (i.e., the pressure) is configured to act on the diverter mechanism 740, causing the diverter mechanism 740 to apply a force onto the end of the second G-size sonobuoy 750(2), which subsequently imparts a force onto the second endcap 730. The pressure in the space between the diverter mechanism 740 and the second end 120 of the SLC 120 increases until the force imparted onto the second endcap 730 is enough to deform (e.g., bend, shear, etc.) the retainer clips that hold the second endcap 730 in the cavity 132 of the SLC 100. This results in the second endcap 730, the second G-size sonobuoy 750(2), and the diverter mechanism 740 being launched or expelled from the cavity 132 of the SLC 100 via the opening 112 of the first end 110 of the SLC 100.

Figure 20:
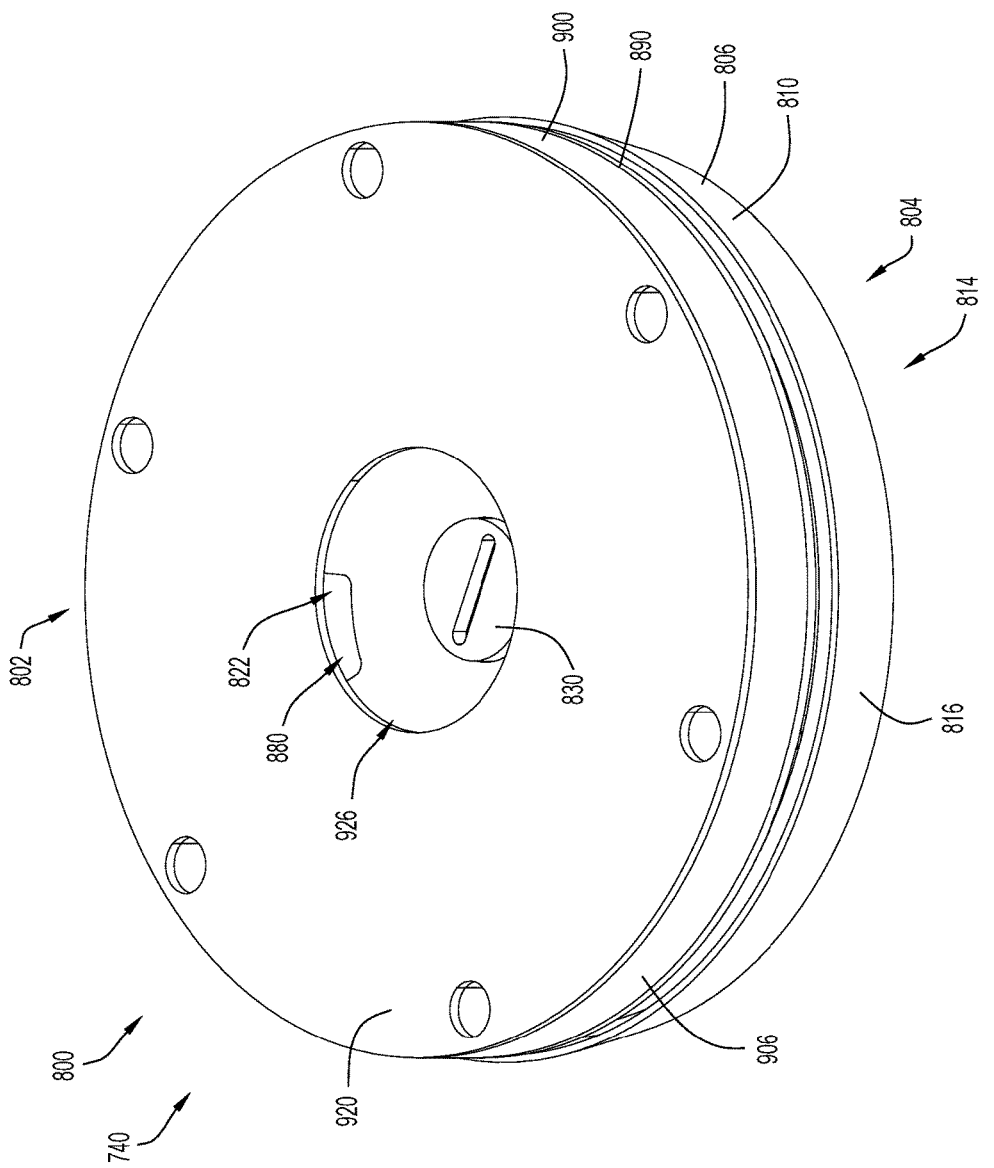
FIG. 20 illustrates a perspective view of an embodiment of the pneumatic air diverter valve of the G-size sonobuoy adapter kit illustrated in FIG. 18.

Turning to FIGS. 20, 21, and 22A-22E, illustrated is an embodiment of the diverter mechanism 740, where the diverter mechanism 740 is a rotary disc mechanism 800. As illustrated in FIG. 20, the rotary disc mechanism 800 is substantially disc-shaped with a top side 802, an opposite bottom side 804, and a sidewall 806 spanning between the top side 802 and the bottom side 804. As best illustrated in the exploded view of FIG. 21, the rotary disc mechanism 800 is collectively formed from a plurality of components, including, a base 810, a plunger 830, a resilient member 846, a pair of rotation imparting members 847(1), 847(2), a rotary cover 850, a rotary disc 870, an intermediate cover 890, a spacer 900, and a top cover 920.

Figure 21:
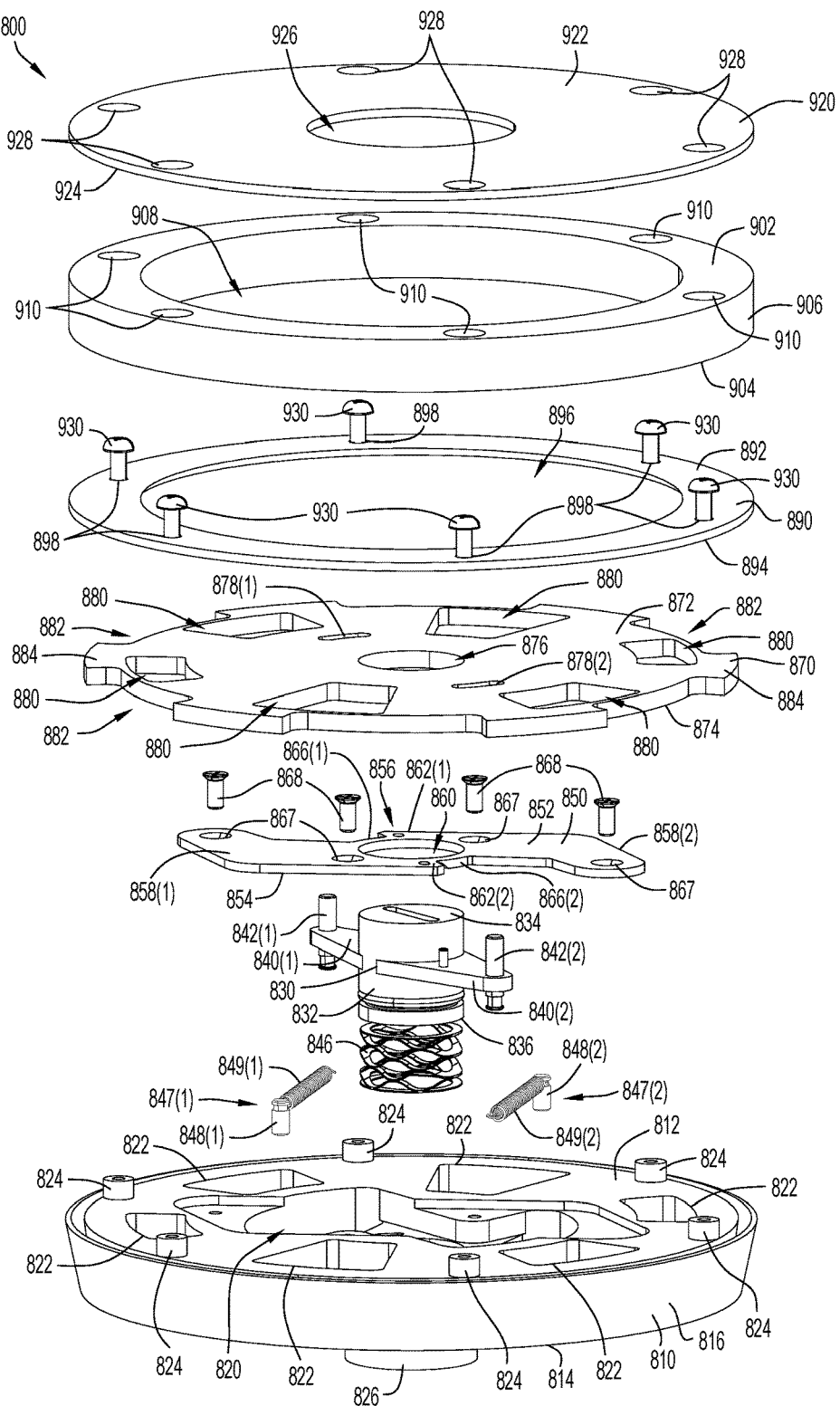
FIG. 21 illustrates an exploded view of the embodiment of the pneumatic air diverter valve illustrated in FIG. 20.

The base 810, as illustrated in FIG. 21, includes a top side 812, a bottom side 814, and a sidewall 816 spanning between the top side 812 and the bottom side 814. As illustrated in FIG. 20, the bottom side 814 of the base 810 serves as the bottom side 804 of the rotary disc mechanism 800. Furthermore, the sidewall 816 of the base 810 serves as part of the sidewall 806 of the rotary disc mechanism 800. Disposed within the top side 812 of the base 810 is a cavity 820. Furthermore, also disposed within the top side 812 of the base 810 are a plurality of apertures 822, where the apertures 822 are oriented annularly around the cavity 820. As explained in further detail below, the apertures 822 are configured to enable the first burst of air into the cavity 132 of the SLC 100. Disposed on, and extending from, the top side of the base 810 are a plurality of columns 824 that are also oriented annularly around the central cavity 820, but such that each column 824 is disposed between a pair of apertures 822 (i.e., the apertures 822 and the columns 824 sequentially alternate around the top surface 812 of the base 810). As further explained below, the columns 824 are configured to at least partially receive the fasteners 930 that secure the top cover 920, the spacer 900, and the intermediate cover 890 to the base 810. FIG. 21 further illustrates that an extension 826 of the cavity 820 extends from the bottom side 814 of the base 810. This extension 826 may be centrally disposed on the bottom side 814 of the base 810. As best illustrated in FIGS. 22A, 22D, and 22E, disposed within the cavity 820 and on opposing sides of the extension 826 are slots 828(1), 828(2).

Continuing with FIG. 21, the plunger 830 includes a cylindrical portion 832 with a first end 834 and an opposite second end 836. The plunger 830 further includes two opposing extension arms 840(1), 840(2) that extend from the cylindrical portion 832 at locations between the first end 834 and the second end 836. Disposed on the ends of the extension arms 840(1), 840(2) are pins 842(1), 842(2), respectively, that extend through the ends of the extension arms 840(1), 840(2), respectively, such that the pins 842(1), 842(2) extend both upwardly from the upper face of the extension arms 840(1), 840(2) and downwardly from the lower face of the extension arms 840(1), 840(2). The extension arms 840(1), 840(2) further include two protuberances 844(1), 844(2), respectively, (FIG. 21 only illustrates protuberance 844(2) as protuberance 844(1) is disposed behind the cylindrical portion 832) that extend upwardly from the extension arms 840(1), 840(2), respectively, at a location proximate to the cylindrical portion 832 of the plunger 830. The protuberances 844(1), 844(2) extend through the extension arms 840(1), 840(2), respectively, such that the protuberances 844(1), 844(2) extend both upwardly from the upper face of the extension arms 840(1), 840(2), respectively, and downwardly from the lower face of the extension arms 840(1), 840(2), respectively. When the rotary disc mechanism 800 is assembled, as illustrated in FIG. 22A, the plunger 830 may be disposed within the cavity 820 of the base 810, and at least partially disposed within the extension 826 of the cavity 820. More specifically, the second end 836 of the cylindrical portion 832 of the plunger 830 may be disposed within the extension 826 of the cavity 820 of the base 810, while the extension arms 840(1), 840(2) of the plunger 830 are disposed in the cavity 820 of the base 810 outside of the extension 826 of the cavity 820.

Figure 22A:
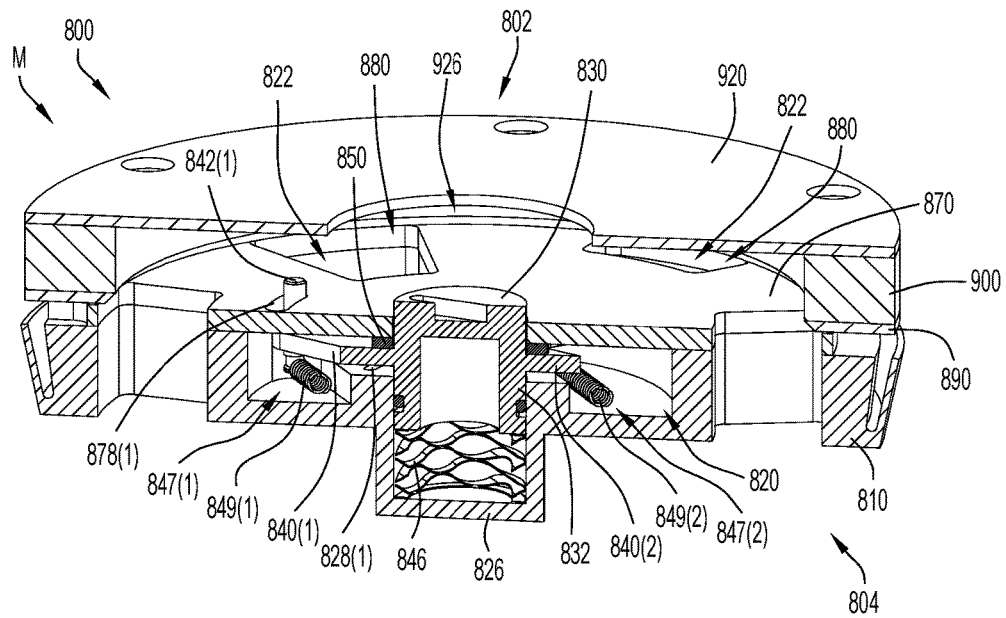
FIGS. 22A-22E illustrate cross-sectional views of the operational stages of the embodiment of the pneumatic air diverter valve illustrated in FIG. 20.

In addition, and as illustrated in FIGS. 21 and 22A, the resilient member 846 may also be disposed within the extension 826 of the cavity 820 when the rotary disc mechanism 800 is assembled. In the embodiment illustrated, resilient member 846 is a wave spring. In other embodiments, however, the resilient member 846 may be a coil spring, a series of leaf springs, or any other type of resilient member. The resilient member 846 is configured to abut the second end 836 of the cylindrical portion 832 of the plunger 830 and impart a force onto the second end 836 of the cylindrical portion 832 of the plunger to bias the plunger 830 to an upper position within the cavity 820. Further disposed within the cavity 820 of the base 810 may be a pair of rotation imparting members 847(1), 847(2). Each rotation imparting member 847(1), 847(2) includes a pin 848(1), 848(2), respectively, and a linear spring 849(1), 849(2), respectively. The linear springs 849(1), 849(2) are configured to be coupled to the pins 848(1), 848(2), respectively, and to the pins 842(1), 842(2), respectively, of the extension arms 840(1), 840(2) of the plunger 830. The pins 848(1), 848(2) of the rotation imparting members 847(1), 847(2), respectively, may be secured within the cavity 820 of the base 810. As further detailed below, because the pins 848(1), 848(2) may be secured within the cavity 820, the linear springs 849(1), 849(2) may be configured to impart rotational forces onto the pins 842(1), 842(2), respectively, and subsequently the plunger 830, in order to rotate the plunger 830 when the plunger 830 is in a certain position within the cavity 820.

Continuing with FIG. 21, the rotary cover 850 includes a top surface 852 and an opposite bottom surface 854. The rotary cover 850 further includes a central portion 856 and two elongated members 858(1), 858(2) extending from the central portion 856 in opposing directions. The central portion 856 includes a central opening 860 that sized and shaped to receive at least the first end 834 of the cylindrical portion 832 of the plunger 830. Disposed adjacent to the central opening 860 on opposing sides are two apertures 862(1), 862(2) that are sized and shaped to receive the protuberances 844(1), 844(2), respectively. The rotary cover 850 further includes a pair of recessed tracks 866(1), 866(2), disposed proximate to the two apertures 862(1), 862(2), and configured to extend around the central opening 860 between the elongated members 858(1), 858(2). Furthermore, each of the elongated members 858(1), 858(2) include a pair of openings 867. When the rotary disc mechanism 800 is assembled, the rotary cover 850 is disposed within the cavity 820 of the base 810. In some embodiments, the rotary cover 850 may be disposed within the cavity 820 such that the top surface 852 of the rotary cover 850 aligns with the top surface 812 of the base 810. Fasteners 868 may extend at least partially through the openings 867 of the elongated members 858(1), 858(2) to secure the rotary cover 850 within the cavity 820 of the base 100. When disposed within the cavity 820, at least the first end 834 of the cylindrical portion 832 of the plunger 830 is inserted through the central opening 860 from the bottom side 854 of the rotary cover 850. In an initial position of the plunger 830, the protuberances 844(1), 844(2) are at least partially inserted into the two apertures 862(1), 862(2). As further detailed below, when the plunger 830 is repositioned such that the protuberances 844(1), 844(2) no longer extend into the apertures 862(1), 862(2), respectively, the plunger 830 rotates such that the protuberances 844(1), 844(2) travel along the recessed tracks 866(1), 866(2), respectively, until the first protuberance 844(1) contacts the first elongated member 858(1) and the second protuberance 844(2) contacts the second elongated member 858(2).

As illustrated in FIG. 21, and as explained previously, the rotary disc mechanism 800 further includes a rotary disc 870. The rotary disc 870 includes a top surface 872 and an opposite bottom surface 874. The rotary disc 870 is substantially circular and further includes a central opening 876 and a pair of slots 878(1), 878(2) disposed on opposing sides of the central opening 876. The central opening 876 is sized and shaped to receive at least the first end 834 of the cylindrical portion 832 of the plunger 830, while the pair of slots 878(1), 878(2) are sized and shaped to at least partially receive a portion of the pins 842(1), 842(2), respectively, of the plunger 830. The slots 878(1), 878(2) are elongated such that the pins 842(1), 842(2) are configured to slide through the slots 878(1), 878(2), respectively. As illustrated, the rotary disc 870 further includes a plurality of air ports 880 that may be oriented annularly around the rotary disc 870. As explained in further detail below, when the rotary disc 870 is in a first position, the plurality of air ports 880 are aligned with the plurality of apertures 822 of the base 810, while in a second position, the plurality of air ports 880 are misaligned with the plurality of apertures 822 of the base 810. In some embodiments, the plurality of air ports 880 may be identical in size and shape to the plurality of apertures 822 of the base 810. The rotary disc 870 further includes a series of recesses 882 and protrusions 884 that are disposed on the edge of the rotary disc 870 in an alternating manner.

When the rotary disc mechanism 800 is assembled, the bottom surface 874 of the rotary disc 870 is disposed proximate and adjacent to the top surface 812 of the base 810. Moreover, at least the first end 834 of the cylindrical portion 832 of the plunger 830 is inserted through the central opening 876 from the bottom side 874 of the rotary disc 870, while the plurality of columns 824 extend through the recesses 882 of the rotary disc 870, each column extending between two of the protrusions 884. When the rotary disc mechanism 800 is assembled, the pins 842(1), 842(2) are also inserted at least partially into the slots 878(1), 878(2), respectively.

Continuing with FIG. 21, an intermediate cover 890 is disposed over the rotary disc 870. The intermediate cover 890 is disc-shaped with a top side 892 and a bottom side 894. As illustrated, the intermediate cover 890 includes a central opening 896 that extends through the intermediate cover 890 from the top side 892 to the bottom side 894. The central opening 896 of the intermediate cover 890 contains a diameter that is larger than the diameter of the central opening 860 of the rotary cover 850 and the diameter of the central opening 876 of the rotary disc 870. The intermediate cover 890 also includes a series of apertures 898 that are oriented annularly around the central opening 896 of the intermediate cover 890. The annular apertures 898 of the intermediate cover 890 are configured to align with the plurality of columns 824 of the base 810. When the intermediate cover 890 is secured to the base 810, the plunger 830, the resilient member 846, the rotation imparting members 847(1), 847(2), rotary cover 850, and rotary disc 870 are secured to the base 810.

The rotary disc mechanism 800, as illustrated in FIG. 21, further includes a spacer 900 that is disposed on the top surface 892 of the intermediate cover 890. The spacer 900 is disc-shaped with a top side 902, an opposite bottom side 904, and a sidewall 906 spanning from the top side 902 to the bottom side 904. As illustrated, the spacer 900 is thicker (i.e., the distance between the top side 902 and the bottom side 904) than the intermediate cover 890. Like the intermediate cover 890, the spacer 900 includes a central opening 908 that extends through the spacer 900 from the top side 902 to the bottom side 904. The central opening 908 of the spacer 900 contains a diameter that is equivalent to the diameter of the central opening 896 of the intermediate cover 890, and larger than the diameter of the central opening 860 of the rotary cover 850 and the diameter of the central opening 876 of the rotary disc 870. Also like the intermediate cover, the spacer 900 also includes a series of apertures 910 that are oriented annularly around the central opening 908 of the spacer 900. The annular apertures 910 of the spacer 900 are configured to align with the plurality of apertures 898 of the intermediate cover 890 and the plurality of columns 824 of the base 810. When the rotary disc mechanism 800 is assembled, as illustrated in FIG. 20, the sidewall 906 of the spacer 900 serves as part of the sidewall 806 of the rotary disc mechanism 800 (along with the sidewall 816 of the base 810). In some embodiments, the spacer 900 may be adhered to the intermediate cover 890 and the top cover 920 via an adhesive. The spacer 900 may be constructed of a foam material that provides a degree of compressibility and resiliency to the spacer 900. This enables the rotary disc mechanism 800 to be securely held in place within the cavity 132 of the SLC 100. In other embodiments, the spacer 900 may be a series of compression springs.

Continuing with FIG. 21, the rotary disc mechanism 800 also includes a top cover 920 that is disposed on the top surface 902 of the spacer 900. The top cover 920 is disc-shaped with a top side 922 and an opposite bottom side 924. As illustrated, the top cover 920 is disc-shaped like that of the intermediate cover 890. The top cover 920 also includes a central opening 926 that extends through the top cover 920 from the top side 922 to the bottom side 924. The central opening 926 of the top cover 920 contains a diameter that is smaller than the diameters of the central opening 896 of the intermediate cover 890 and the central opening 908 of the spacer 900, but larger than the diameter of the central opening 860 of the rotary cover 850 and the diameter of the central opening 876 of the rotary disc 870. Like the intermediate cover 890 and the spacer 900, the top cover 920 includes a series of apertures 928 that are oriented annularly around the central opening 926 of the top cover 920. The annular apertures 928 of the top cover are configured to align with the plurality of apertures 898 of the intermediate cover 890, the plurality of apertures 910 of the spacer 900, and the plurality of columns 824 of the base 810.

When the rotary disc mechanism 800 is assembled, as illustrated in FIG. 20, the plurality of apertures 928 of the top cover 920 are configured to receive fasteners 930. Because the plurality of apertures 928 of the top cover 920 are aligned with the plurality of apertures 898 of the intermediate cover 890, the plurality of apertures 910 of the spacer 900, and the plurality of columns 824 of the base 810, when the fasteners 930 are inserted into the apertures 928 of the top cover 920, the fasteners 930 extend through the apertures 910 of the spacer 900, the apertures 898 of the intermediate cover 890, and into the columns 824 base 810 to secure the top cover 920, the spacer 900, the intermediate cover 890, and the rotary disc 870 to the base 810. Furthermore, when assembled, the top side 802 of the rotary disc mechanism 800 is formed from the top side 922 of the top cover 920. As illustrated, the plunger 830 is visible through the central opening 926 of the top 920. When inserted into the cavity 132 of the SLC 100, the top side 802 of the rotary disc mechanism 800 faces the second end 120 of the SLC 100, while the bottom side 804 of the rotary disc mechanism 800 faces, and may be in abutment with, the second G-size sonobuoy 750(2).

FIGS. 22A-22E illustrate the cross-sectional views of the operation and various positions of the components of the rotary disc mechanism 800 during the various stages of launching two G-size sonobuoys 750(1), 750(2), as illustrated in FIGS. 19A-19D. As illustrated in FIG. 22A, the rotary disc mechanism 800 is oriented in static stage M, which occurs prior to the rotary disc mechanism 800 receiving a first burst of air from the pneumatic launching mechanism. The resilient member 846 biases the plunger 830 to an upper position, where the extension arms 840(1), 840(2) of the plunger 830 are disposed against the rotary cover 850 such that the protuberances 844(1), 844(2) are disposed within the apertures 862(1), 862(2), respectively, of the rotary cover 850, and the pins 842(1), 842(2) of the plunger 830 are disposed within the slots 878(1), 878(2), respectively of the rotary disc 870. Moreover, in this first static position, the rotary disc 870 is positioned into an initial or open position, where the air ports 880 are aligned with the plurality of apertures 822 of the base 810.

Figure 22B:
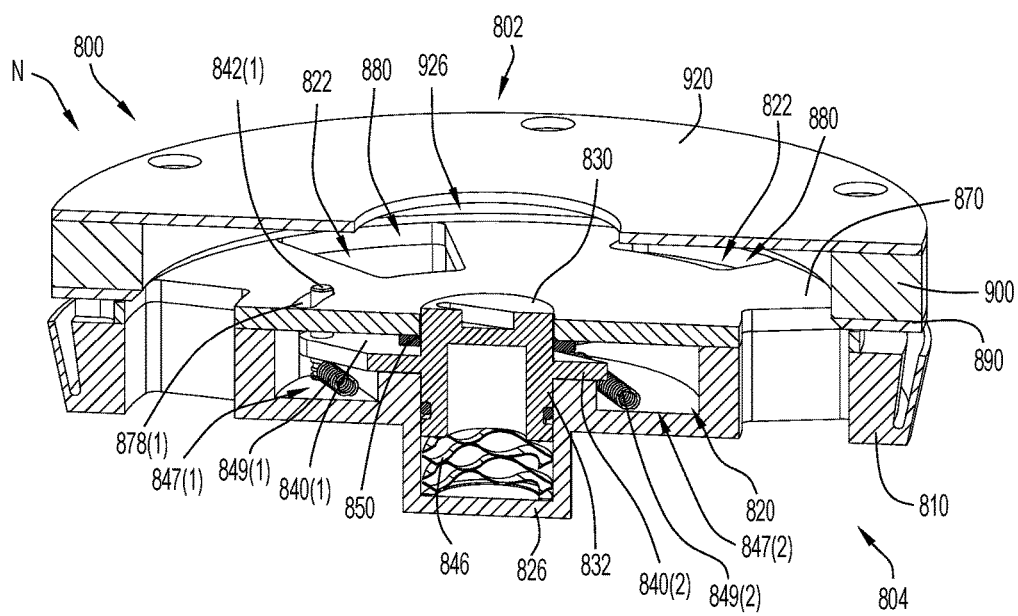
Figure 22C:
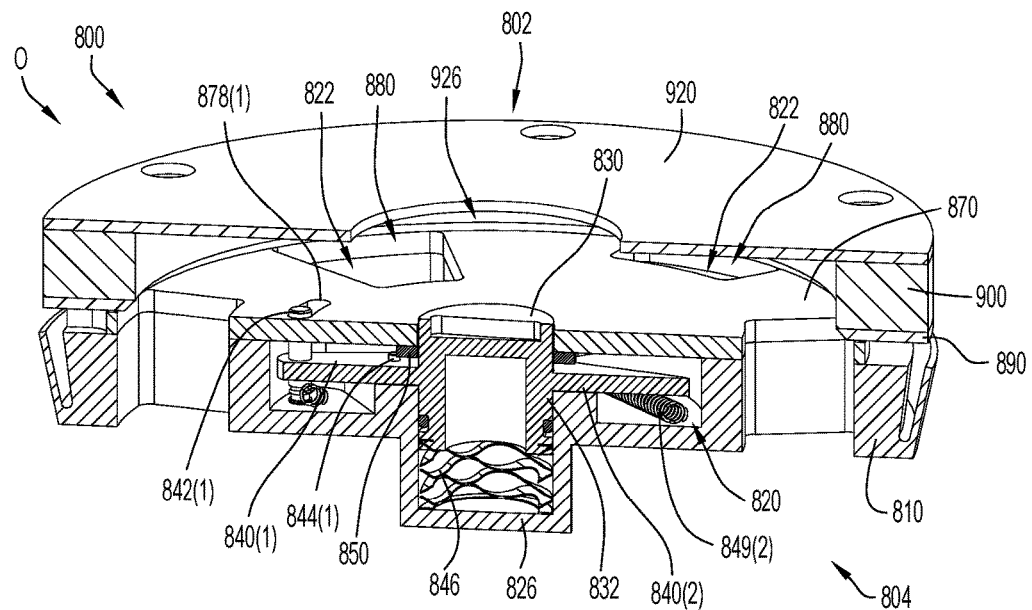
Figure 22D:
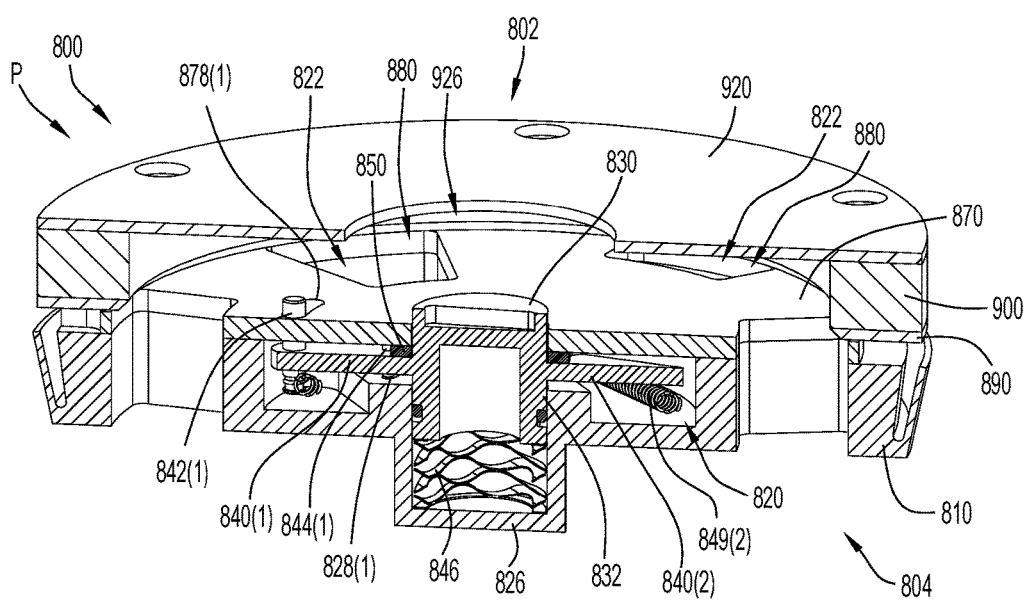
Figure 22E:
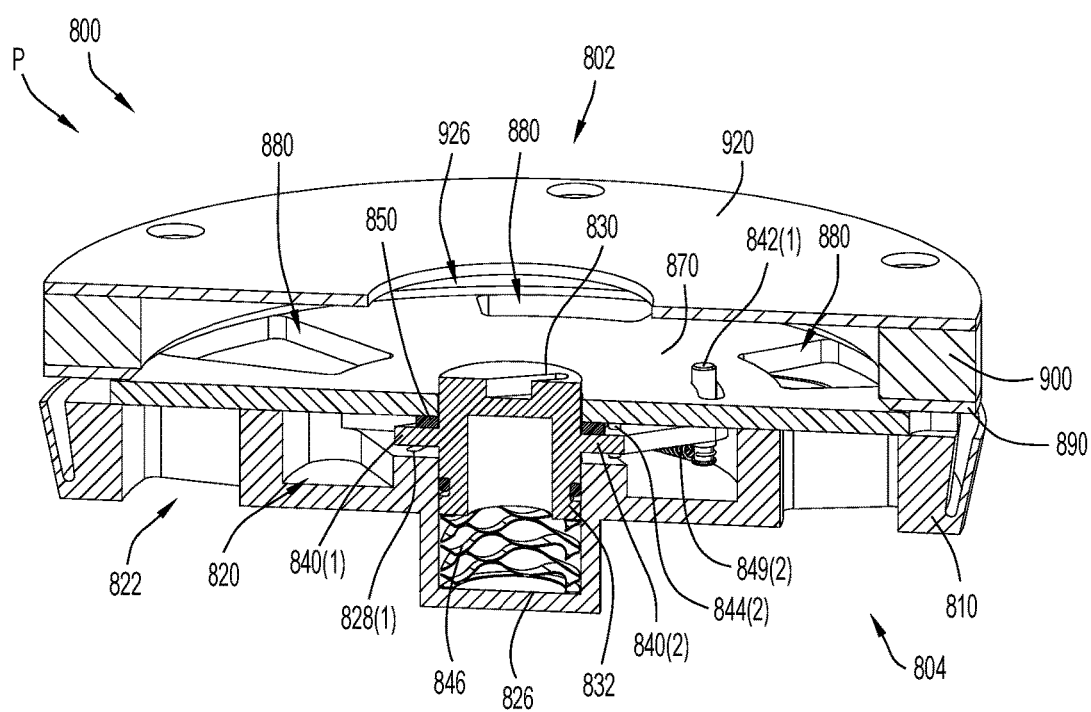

As illustrated in FIGS. 22B and 22C, when air is forced onto the top side 802 of the rotary disc mechanism 800 (i.e., air impacts the top side 802 of the rotary disc mechanism 800), the air is forced into the central opening 926 of the top cover 920. Because the air ports 880 of the rotary disc 870 are aligned with the apertures 822 of the base 810, as the air flows into the rotary disc mechanism 800 through the central opening 926, the air continues to flow through and exit the rotary disc mechanism 800 by flowing out of the aligned air ports 880 and apertures 822. FIG. 22B illustrates stage N, where the force of air flowing through the rotary disc mechanism 800 overcomes the biasing force of the resilient member 846 (i.e., the plunger 830 is depressed by the force of air), which results in the plunger 830 sliding farther into the extension 826 of the cavity 820 of the base 810. As further illustrated, as the plunger 830 is depressed by the first burst of air, the upper surfaces of the extension arms 840(1), 840(2) move downwardly away from the bottom surface 854 of the rotary cover 850 such that the protuberances 844(1), 844(2) are no longer disposed within the apertures 862(1), 862(2), respectively, of the rotary cover 850. While not illustrated, when the plunger 830 is depressed, the protuberances 844(1), 844(2) extend into the slots 828(1), 828(2), respectively, that are disposed within the cavity 820 around the extension 826. FIG. 22C illustrates stage O of the rotary disc mechanism 800, where the plunger 830 may partially rotate with respect to the other components of the rotary disc mechanism 800 while the plunger 830 is still being depressed by the force of air flowing through the rotary disc mechanism 800. Because the protuberances 844(1), 844(2) are no longer disposed within the apertures 862(1), 862(2), respectively, of the rotary cover 850, the linear springs 849(1), 849(2) of the rotation imparting members 847(1), 847(2) are configured to impart rotational forces onto the extension arms 840(1), 840(2), respectively, of the plunger 830 to partially rotate the plunger 830. As illustrated, in stage 0, the plunger 830 is rotated until the protuberances 844(1), 844(2) have slid along the slots 828(1), 828(2) from one end to the other. This coincides with the pins 842(1), 842(2) sliding from one end of the slots 878(1), 878(2), respectively, of the rotary disc 870 to the other end of the slots 878(1), 878(2), respectively. This partial rotation causes the protuberances 844(1), 844(2) to no longer be aligned with the apertures 862(1), 862(2), respectively, of the rotary cover 850, and are instead aligned with the recessed tracks 866(1), 866(2), respectively, of the rotary cover 850.

As illustrated in FIG. 22D, once the flow of air from the first burst of air has ended, the rotary disc mechanism 800 is reconfigured into stage P, where the resilient member 846 returns the plunger 830 to the upper position within the cavity 820 and the extension 826 of the base 810 so that the upper faces of the extension arms 840(1), 840(2) are disposed at least partially adjacent to the bottom surface 854 of the rotary cover 850. Moreover, in stage P, and unlike stage M, the protuberances 844(1), 844(2) are located within of the recessed tracks 866(1), 866(2), respectively, of the rotary cover 850, not the apertures 862(1), 862(2), respectively, of the rotary cover 850.

As illustrated in FIG. 22E, the rotary disc mechanism 800 is automatically reconfigured into stage Q, where the air ports 880 of the rotary disc 870 are no longer aligned with the apertures 822 of the base 810. The linear springs 849(1), 849(2) of the rotation imparting members 847(1), 847(2) continue to impart rotational forces onto the extension arms 840(1), 840(2), respectively, of the plunger 830 to continue to rotate the plunger 830. Because the pins 842(1), 842(2) have already slid from one end of slots 878(1), 878(2), respectively, of the rotary disc 870 to the other end of the slots 878(1), 878(2), respectively, continual rotation of the plunger 830 in the same direction causes the rotary disc 870 to rotate until the air ports 880 of the rotary disc 870 are no longer aligned with the apertures 822 of the base 810. The rotation imparting members 847(1), 847(2) rotate the plunger 830, and subsequently the rotary disc 870 until the air ports 880 of the rotary disc 870 are not in fluid communication with the apertures 822 of the base 810. In the embodiment illustrated, the plunger 830 is rotated by the rotation imparting members 847(1), 847(2) until the protrusions 884 of the rotary disc 870 contact columns 824 of the base 820. In another embodiment, the plunger 830 is rotated by the rotation imparting members 847(1), 847(2) until the first protuberance 844(1) has traveled through recessed track 866(1) and into contact with the first elongated members 858(1) of the rotary cover 850, while the second protuberance 844(2) has traveled through recessed track 866(2) and into contact with the second elongated members 858(2). When the second burst of air from the pneumatic launching mechanism imparts air onto the top side 802 of the rotary disc mechanism 800 in stage Q, the air is incapable of flowing through the air ports 880 of the rotary disc 870 and the apertures 822 of the base 810 because the air ports 880 and the apertures 822 are no longer aligned with one another (i.e., creating a seal that prevents air from traveling through the rotary disc mechanism 800). Thus, because the second burst of air cannot flow through the rotary disc mechanism 800 in stage Q, when the rotary disc mechanism 800 is in stage Q, the rotary disc mechanism 800 operates as a piston within the cavity 132 of the SLC, as illustrated in FIG. 19D. As previously explained, as the second burst of air acts on the rotary disc mechanism 800, the force of air causes the rotary disc mechanism 800 to impart force onto the second G-size sonobuoy 750(2), which launches the second G-size sonobuoy 750(2), along with the second endcap 730 and the rotary disc mechanism 800 itself, from the SLC 100.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. An adapter for launching G-size sonobuoys from a sonobuoy launching container, the adapter comprising:
   a first piston disposed in a cavity of the sonobuoy launching container between a first end of the cavity and a second end of the cavity;
   a first endcap disposed in the cavity of the sonobuoy launching container proximate to the first end of the cavity, a first G-size sonobuoy being retained in the cavity of the sonobuoy launching container between the first endcap and the first piston;
   a second endcap disposed in the cavity of the sonobuoy launching container proximate to the first piston; and
   a diverter mechanism disposed within the cavity of sonobuoy launching container proximate to the second end of the cavity, a second G-size sonobuoy being retained in the cavity of the sonobuoy launching container between the second endcap and the diverter mechanism, the diverter mechanism being initially in an open configuration that diverts a first burst of air received by the sonobuoy launching container around the second G-size sonobuoy and to the first piston, and automatically reconfigures to a closed configuration after diverting the first burst of air, the diverter mechanism in the closed configuration serving as a second piston when the sonobuoy launching container receives a subsequent second burst of air.

2. The adapter according to claim 1, wherein the first endcap comprises:
   first retainer clips that interact with the first end of the cavity of the sonobuoy launching container to retain the first G-size sonobuoy within the cavity of the sonobuoy launching container until the first burst of air acts on the first piston.

3. The adapter according to claim 2, wherein the second endcap comprises:
   second retainer clips that interact with the cavity of the sonobuoy launching container between the first end and the second end of the cavity to retain the second G-size sonobuoy within the cavity of the sonobuoy launching container until the second burst of air acts on the diverter mechanism.

4. The adapter according to claim 3, wherein the second endcap further comprises:
   one or more openings to enable the first burst of air to flow to the first piston via the one or more openings.

5. The adapter according to claim 4, wherein the one or more openings is a single opening disposed centrally on the second endcap.

6. The adapter according to claim 1, wherein the cavity has a first diameter and the second G-size sonobuoy has a second diameter, the first diameter being greater than the second diameter.

7. The adapter according to claim 1, wherein the first burst of air is configured to launch the first G-size sonobuoy from the cavity of the sonobuoy launching container.

8. The adapter according to claim 7, wherein the first burst of air is further configured to launch the first endcap and the first piston from the cavity of the sonobuoy launching container with the launching of the first G-size sonobuoy.

9. The adapter according to claim 7, wherein the second burst of air is configured to launch the second G-size sonobuoy from the cavity of the sonobuoy launching container.

10. The adapter according to claim 9, wherein the second burst of air is further configured to launch the second endcap and the diverter mechanism from the cavity of the sonobuoy launching container with the launching of the second G-size sonobuoy.

11. A pneumatic diverter mechanism comprising:
    a base with a top side, a bottom side, and a central cavity disposed within the top side, the base having at least one annular opening disposed on the top side of the base and extending through to the bottom side of the base;
    a plunger slidably and rotatably disposed within the central cavity of the base, between a first position, a second position, and third position, the plunger comprising:
      a cylindrical portion having a first end and a second end, and
      one or more extension arms extending from the cylindrical portion between the first end and the second end; and
    a rotary disc operatively coupled to the plunger, the rotary disc including at least one air port and rotatable between an open position, where the at least one air port is aligned with the at least one annular opening of the base, and a closed position, where the at least one air port is misaligned with the at least annular opening of the base; and
    wherein, when the plunger is in the first position, the rotary disc is in the open position, and the pneumatic diverter mechanism receives a first burst of air, the first burst of air flows through the at least one air port of the rotary disc and the at least one annular opening of the base while sliding the plunger from the first position to the second position, the plunger automatically rotating from the second position to the third position after the first burst of air, the rotation of the plunger from the second position to the third position causing the rotary disc to rotate from the open position to the closed position.

12. The pneumatic diverter mechanism of claim 11, further comprising:
    a resilient member coupled to the second end of the cylindrical cavity of the plunger, the resilient member imparting a first biasing force onto the plunger that biases the plunger to the first position.

13. The pneumatic diverter mechanism of claim 12, further comprising:
    at least one linear spring disposed within the central cavity and coupled to the one or more extension arms of the plunger, the at least one linear spring imparting a second biasing force onto the plunger that biases the plunger to the third position.

14. The pneumatic diverter mechanism of claim 13, wherein the first burst of air imparts a force onto the first end of the cylindrical portion of the plunger that overcomes the first biasing force of the resilient member to slide the plunger from the first position to the second position.

15. The pneumatic diverter mechanism of claim 14, wherein sliding the plunger from the first position to the second position enables the second biasing force to rotate the plunger from the second position to the third position.

16. The pneumatic diverter mechanism of claim 11, wherein when the rotary disc is in the closed position, the misalignment of the at least one air port with the at least one annular opening prevents air from flowing through the pneumatic diverter mechanism.

17. A pneumatic diverter mechanism comprising:
    a base with a top side, a bottom side, and a central cavity disposed within the top side, the base including one or more annular openings disposed in the top side and extending through the base to the bottom side;

a plunger rotatably disposed in the central cavity of the base and configured to rotate with respect to the base between a first position and a second position; and a rotary disc coupled to the plunger, the rotary disc including one or more air ports and configured to rotate between an open position, where the one or more air ports are aligned with the one or more annular openings, and a closed position, where the one or more air ports are misaligned with the one or more annular openings, wherein, when the pneumatic diverter mechanism receives a first burst of air, the first burst of air flows through the pneumatic diverter mechanism via the aligned one or more air ports of the rotary disc and the one or more annular openings of the base, and after the first burst of air and prior to receiving a second burst of air, the plunger automatically rotates from the first position to the second position, causing the rotary disc to rotate from the open position to the closed position.

18. The pneumatic diverter mechanism of claim 17, wherein when the rotary disc is in the closed position, the misalignment of the one or more air ports with the one or more annular openings prevents air from flowing through the pneumatic diverter mechanism.

19. The pneumatic diverter mechanism of claim 17, further comprising:

a rotary cover coupled to central cavity of the base and configured to retain the plunger within the central cavity.

20. The pneumatic diverter mechanism of claim 17, further comprising:

one or more rotation imparting members disposed within the central cavity of the base and configured to impart rotation onto the plunger after the pneumatic diverter mechanism receives the first burst of air.

* * * * *